(12) United States Patent
Isozu

(10) Patent No.: US 7,898,979 B2
(45) Date of Patent: Mar. 1, 2011

(54) RADIO AD HOC COMMUNICATION SYSTEM, TERMINAL, PROCESSING METHOD IN THE TERMINAL, AND PROGRAM CAUSING THE TERMINAL TO EXECUTE THE METHOD

(75) Inventor: Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 10/548,686

(22) PCT Filed: Mar. 10, 2004

(86) PCT No.: PCT/JP2004/003117

§ 371 (c)(1),
(2), (4) Date: Sep. 9, 2005

(87) PCT Pub. No.: WO2004/082225

PCT Pub. Date: Sep. 23, 2004

(65) Prior Publication Data

US 2006/0268688 A1    Nov. 30, 2006

(30) Foreign Application Priority Data

Mar. 13, 2003 (JP) .......................... P2003-068961
Mar. 13, 2003 (JP) .......................... P2003-068962

(51) Int. Cl.
*H04L 12/28* (2006.01)

(52) U.S. Cl. .................. 370/254; 370/227; 370/255; 370/331; 455/304; 455/450; 709/239

(58) Field of Classification Search .......... 370/227, 370/255, 331; 455/3.04, 450, 304; 709/239
See application file for complete search history.

(56) References Cited

U.S. PATENT DOCUMENTS 5,787,073 A    7/1998  Ikeda
(Continued)

FOREIGN PATENT DOCUMENTS

JP    05-083260    4/1993
(Continued)

OTHER PUBLICATIONS

Japanese Office Action issued on Feb. 19, 2008 in connection with Japanese Patent Application No. JP2003-068961.
(Continued)

*Primary Examiner*—Pankaj Kumar
*Assistant Examiner*—Lonnie Sweet
(74) *Attorney, Agent, or Firm*—SNR Denton US LLP

(57) ABSTRACT

A wireless ad hoc communication system is provided in which in the case where an alternative route can not be discovered in a certain node, a restoration is attempted in an intermediate node instead of deleting all routes up to a transmission source.

In order to do so, a route discovery process 20 discovers and sets a route when a corresponding route is not set at the time of data communication request 10. A link state management process 40 monitors a state of a link 30 on the route set by the route discovery process 20, and updates a link state in a route table of each wireless terminal. When the link quality deteriorates, a route information notification process 50 notifies the link state to urge a retention of transmission data. An alternative route search process 60 searches an alternative route when the link quality deteriorates, and traces back to a terminal on the transmission side in order to search further when the alternative route is not discovered. A route switching process 70 switches a possible alternative route as a qualified route.

2 Claims, 24 Drawing Sheets

U.S. PATENT DOCUMENTS

| | | | |
|---|---|---|---|
| 5,987,011 A * | 11/1999 | Toh | 370/331 |
| 6,400,681 B1 * | 6/2002 | Bertin et al. | 370/218 |
| 6,879,830 B1 * | 4/2005 | Vollmer et al. | 455/442 |
| 7,159,035 B2 * | 1/2007 | Garcia-Luna-Aceves et al. | 709/241 |
| 2002/0012320 A1 * | 1/2002 | Ogier et al. | 370/252 |
| 2002/0093954 A1 * | 7/2002 | Weil et al. | 370/389 |
| 2003/0037167 A1 * | 2/2003 | Garcia-Luna-Aceves et al. | 709/238 |
| 2004/0218548 A1 * | 11/2004 | Kennedy et al. | 370/254 |
| 2005/0135330 A1 * | 6/2005 | Smith et al. | 370/351 |
| 2005/0185632 A1 * | 8/2005 | Draves et al. | 370/351 |
| 2005/0195835 A1 * | 9/2005 | Savage et al. | 370/401 |
| 2006/0193333 A1 * | 8/2006 | Baughan et al. | 370/400 |
| 2008/0151810 A1 * | 6/2008 | Watanabe et al. | 370/315 |

FOREIGN PATENT DOCUMENTS

| | | |
|---|---|---|
| JP | 08-331129 | 12/1996 |
| JP | 10-023071 | 1/1998 |
| JP | 11-298492 | 10/1999 |
| JP | 30-62041 | 4/2000 |
| JP | 2000-253009 | 9/2000 |
| JP | 2000-341323 | 12/2000 |
| WO | WO03005629 | 1/2003 |

PUBLICATIONS

European Search Report corresponding to European Serial No. 04719138 dated Oct. 14, 2010.

Jiang, M-H et al., "An Efficient Multiple-Path Routing Protocol for Ad Hoc Networks"; Computer Communications Elsevier Science Publishers; vol. 25, No. 5, pp. 478-484; Mar. 15, 2002.

Royer, E. M. et al; A Review of Current Routing Protocol for Ad Hoc Mobile Wireless Networks; IEEE Personal Communications, IEEE Communications Society; vol. 6, No. 2,; pp. 46-55; Apr. 1, 1999.

Sung-Ju Lee et al.; "AODV-BR: Backup Routing in Ad Hock Networks"; Wireless Communications and Networking Conference; vol. 3, Sep. 23, 2000; pp. 1311-1316.

Hwang Y et al.; An Adaptive Routing Protocol for Ad-Hoc Networks Using Multiple Disjoint Paths; vol. Conf. 53, pp. 2249-2253; May 6, 2001.

Goff, T. et al.; "Preemptive Routing in Ad Hoc Networks"; Proceedings of the 7th Annual International Conference on Mobile Computing and Networking; vol. Conf. 7, pp. 43-52; Jul. 16, 2001.

Dube, R., et al.; "Signal Stability-Based Adaptive Routing (SSA) for Ad Hoc Mobile Networks"; vol. 4, No. 1; pp. 36-45; Feb. 1, 1997.

* cited by examiner

FIG. 5

| Destination Address (611) | Transfer Destination Address (612) | Number of Destination Hops (613) | Link State (614) | Sequence Number (615) | Owner (616) | Preceding List (617) |
|---|---|---|---|---|---|---|
| Terminal S | Terminal A | 2 | V | 1 | 0 | Terminal D |
| Terminal D | Terminal D | 1 | S | 2 | 1 | Terminal A |
| Terminal E | Terminal E | 1 | V | 3 | 1 | Terminal A |
| ⋮ | ⋮ | ⋮ | ⋮ | ⋮ | ⋮ | ⋮ |

610

Reception of Route Information Notification ↓   Switching to Alternative Route ↓

Data Transmitted from Terminal A to Terminal B

Data Retained in Data Buffer of Terminal A

Data Transmitted from Terminal A to Terminal E

FIG. 18
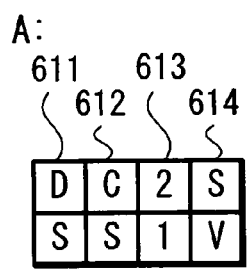
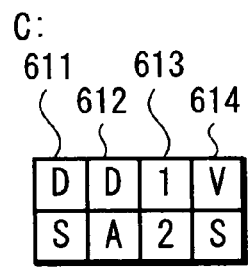
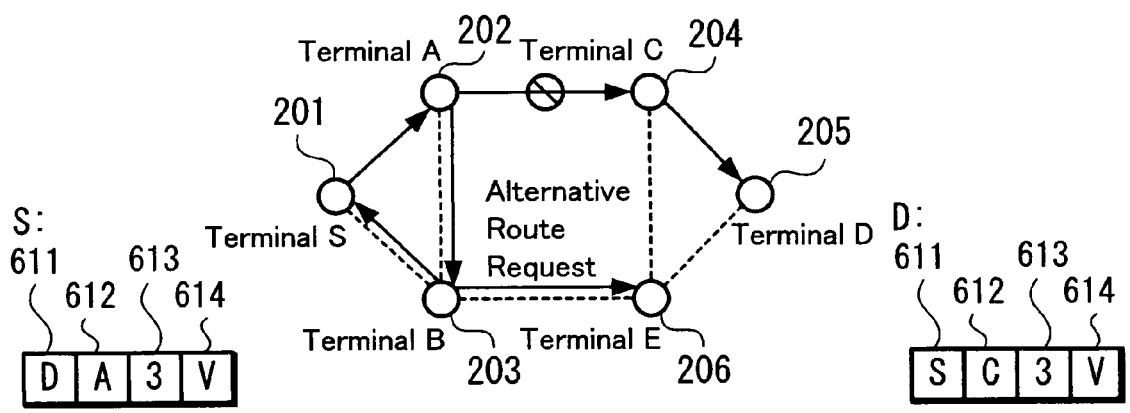
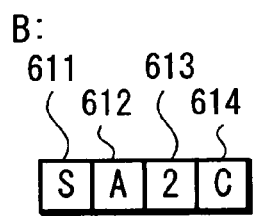
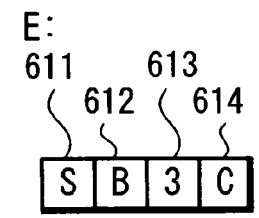

RADIO AD HOC COMMUNICATION SYSTEM, TERMINAL, PROCESSING METHOD IN THE TERMINAL, AND PROGRAM CAUSING THE TERMINAL TO EXECUTE THE METHOD

TECHNICAL FIELD

The present invention relates to a wireless ad hoc communication system, and particularly relates to a wireless ad hoc communication system, a terminal in this system, and a processing method therein as well as a program to make a computer (terminal) execute this method, wherein an alternative route is discovered in order to prepare for a route switching thereafter during transmission of a packet when the intermediate link quality deteriorates.

BACKGROUND ART

Since a miniaturization and performance enhancement of an electronic device has advanced and it becomes possible to carry and use easily the electronic device, there is a requirement for an environment that makes communication possible by connecting a terminal to a network at a place where a necessity occurs. As one of such environments, a development of a network that is temporarily established whenever necessary, specifically wireless ad hoc network technology, has been progressed. In this wireless ad hoc network, a specific access point is not provided and each terminal (for example, computer, handheld information terminal (PDA: Personal Digital Assistance), mobile phone unit, and the like) is autonomously distributed and mutually connected.

In this wireless ad hoc network, since a change in topology frequently occurs differently from a conventional fixed network, it is necessary to establish a route control method for securing reliability, specifically a routing protocol. The routing protocol of the wireless ad hoc network which has been proposed presently is roughly classified into two categories that are an on-demand method and a table drive method. In addition, a hybrid method integrating these two methods has also been proposed.

The table drive method and the hybrid method are said to be comparatively failure-resistant since route information is always exchanged. On the other hand, a size of an overhead due to constant transmission and reception of the information becomes a problem. For example, it is inconvenient to always exchange the route information from a view point of power consumption when considering an environment in which a mobile device driven by a battery is connected to a wireless ad hoc network. In addition, there is also such a problem that it is not possible to cope with a sudden failure when a cycle of updating a route table is long.

On the other hand, in case of the on-demand method, a route is formed by transmitting a route discovery request immediately before starting communication, and therefore even when a failure suddenly occurs in a link at a stage where the communication starts, a valid route is formed disregarding that link. However, when the quality of the link being used deteriorates during the communication such that the route becomes not usable, the communication is immediately interrupted and it is necessary to form a route from a transmission source once again.

As a typical routing protocol of the on-demand method, there is an AODV (Ad hoc On-demand Distance Vector) protocol which is proposed by the MANET WG (Mobile Ad hoc NETwork Working Group) of IETF (Internet Engineering Task Force), for example. In this AODV protocol, a method has been proposed in which a message requesting a rediscovery of a route is transmitted from nodes at both ends and a route is newly formed by a method called "local repair" when a failure occurs in a link to result in break (for example, refer to Non-patent reference 1).

[Non-Patent Reference 1]

"Ad hoc ON-demand Distance Vector Routing", Charles E. Perkins, et al., (USA), IETF, Feb. 17, 2003, pp. 23-25, Internet drafts <http://www.ietf.org/internet-drafts/draft-ietf-manet-aodv-13.txt>

DISCLOSURE OF THE INVENTION

According to the above-described prior art, a route to which a failure occurs can be repaired by discovering an alternative route, but when such repair is not possible, either of nodes having a link in which the failure occurs as the route transmits a route error message to a transmission source. A node that has received the route error message transfers the route error message further to the transmission source after deleting the corresponding route.

Due to such nature, when a failure occurs in one link and a repair is not possible, all routes are to be deleted while repeating the transfer of the route error message. For example, in such an ad hoc network that has 10 hops from a transmission source to a reception destination, when a failure occurs in the last one hop and a repair is not possible, all routes are to be erased. Making up a route again from the beginning not only incurs calculation costs but also requires time costs and incurs packet loss.

Particularly, in a wireless ad hoc network, since a change in topology occurs frequently due to a movement of a terminal (node), a radio wave condition or the like, it is important to secure a method capable of communication even at the time of a break of a link. In the above-described prior art, when a failure occurs in a link, it is tried to discover an alternative route from a node where the failure is discovered, however, it is necessary to erase all routes when that node once fails to discover an alternative route. On the other hand, the calculation costs and time costs become considerably high in a method of discovering a route once again from a transmission source. Particularly, in a large scale ad hoc network, since it is too costly to erase all routes and to perform a route discovery all over again from a transmission source even when a failure occurs in one link close to a reception destination, this method is not desirable in an environment of a power saving orientation where a mobile device is assumed as a node.

Moreover, in the above-described prior art, the rediscovery of the route is performed after the failure occurs in the link to result in a break. Therefore, there is a possibility that a smooth switching to a newly discovered route is not possible since it takes time to rediscover a route after the break of the link. Due to this reason, the method of the prior art is considered not suitable to a situation where instantaneousness is required, such as a case of a real-time distribution of a moving image and voice, for example.

Particularly, in the wireless ad hoc network, it is important to secure a method capable of communication even at the time of a break of a link since a change in topology occurs frequently due to a movement of a terminal (node), a radio wave condition, and the like. Typically, a break of a link does not occur suddenly, but there are many cases where the link quality gradually deteriorates to be an eventual break. With an alternative route being discovered in advance during a process of such gradual deterioration, it is possible to cope with a failure instantaneously, and consequentially it is expected to improve the reliability.

Accordingly, the present invention is to attempt a repair in an intermediate node without deleting all routes up to a transmission source when an alternative route can not be discovered in a certain node in a wireless ad hoc communication system.

Further, the present invention is to obtain a prompt route switching with an alternative route being discovered in advance in order to prepare for a situation where the quality of a link is deteriorated to result in break during communication in the wireless ad hoc communication system.

In order to solve the problems described above, a wireless ad hoc communication system according to the present invention is formed of a plurality of terminals, including: a first intermediate terminal which transmits an alternative route discovery request when the quality of a link connected thereto deteriorates between a source terminal that transmits communication data and a destination terminal that receives this communication data; and a second terminal which is positioned upstream with respect to the first intermediate terminal between the source terminal and the destination terminal and which transmits data to the first intermediate terminal, wherein the first intermediate terminal transmits a route error notification to the second terminal when the request fails, and the second intermediate terminal transmits an another-alternative-route discovery request when the notification is received from the first intermediate terminal. Accordingly, the second intermediate terminal attempts restoration without deleting all routes up to a transmission source when the alternative route can not be discovered in the first intermediate terminal.

Further, the terminal of the present invention includes: a route table in which a destination address of communication, the next transfer destination address to reach the destination address, a link state of a link connecting to the transfer destination address, and an address list of a transmission source that transmits the communication directed to the destination address to this terminal are made to correspond and are retained as a route entry; means for monitoring a state of the link and for updating the link state; means for transmitting to another terminal an alternative route discovery request with respect to the corresponding destination address, when the above-described link state becomes a stretched state; and means for transmitting a route error notification to the transmission source shown in the address list when the request fails. Accordingly, the alternative route is searched when the link on the route becomes the stretched state, and the alternative route is searched further in a terminal of an upper stream than this terminal by transmitting the route error notification when the search fails.

Further, the terminal of the present invention includes: a route table in which a destination address of communication, the next transfer destination address to reach the destination address, a link state of a link connecting to the transfer destination address, and an address list of a transmission source that transmits the communication directed to the destination address to this terminal are made to correspond and are retained as a route entry; means for monitoring a state of the link and for updating the link state; and means for transmitting route information on the link to the transmission source shown in the address list when the link state becomes a stretched state. Accordingly, transmission data is retained in a data buffer in a terminal of an upper stream than this terminal in preparation for a route switching thereafter by notifying the route information.

Further, the terminal of the present invention includes a data buffer and means for retaining data being transmitted to another terminal in the data buffer when route information on a link whose link state becomes a stretched state is received from the above-described another terminal during transmission of the data to the another terminal. Accordingly, the transmission data retained in the data buffer in preparation for a route switching thereafter when receiving the notification of the route information.

Further, a processing method of the present invention is a processing method in a terminal provided with a route table in which a destination address of communication, the next transfer destination address to reach the destination address, a link state of a link connecting to the transfer destination address, and an address list of a transmission source that transmits the communication directed to the destination address to this terminal are made to correspond and are retained as a route entry, including the steps of: monitoring a state of the link and updating the link state; transmitting route information on the link to the transmission source shown in the address list when the link state becomes a stretched state; transmitting to another terminal an alternative route discovery request with respect to the corresponding destination address, when the link state becomes a stretched state; and transmitting a route error notification to the transmission source shown in the address list when the request fails. Accordingly, when the link on the route becomes the stretched state, the link state is notified and the transmission data is retained in the data buffer in preparation for a route switching, and at the same time the alternative route is searched and then the discovery of the alternative route is urged in a terminal of an upper stream than this terminal by transmitting the route error notification when the search fails.

Further, the processing method of the present invention is a processing method in a terminal provided with a data buffer, including the steps of: retaining data being transmitted to another terminal in the data buffer when route information on a link whose link state becomes a stretched state is received from another terminal during the transmission of the data to another terminal; transmitting an alternative route discovery request for the destination address to further another terminal when a route error notification is received from another terminal within a predetermined time after receiving the route information; and discarding the data retained in the buffer when the route error notification is not received from another terminal even when the predetermined time passes after receiving the route information. Accordingly, the discovery of the alternative route is urged in a terminal of an upper stream than this terminal by transmitting the route error notification when the search for the alternative route fails, and the data that becomes unnecessary is discarded from the data buffer when the search for the alternative route is presumed to be successful.

Further, the processing method of the present invention is a processing method in a terminal provided with: a route table in which a destination address of communication, the next transfer destination address to reach the destination address, a link state of a link connecting to that transfer destination address, and an address list of a transmission source that transmits the communication directed to the destination address to this terminal are made to correspond and are retained as a route entry, and a data buffer, including the steps of: retaining data being transmitted to another terminal in the data buffer when a route information on a link whose link state becomes a stretched state is received from another terminal during the transmission of the data to another terminal; transmitting an alternative route discovery request with respect to the destination address to further another terminal when a route error notification is received from another terminal within predetermined time after receiving the route information; transmitting a command to switch to this discovered alternative route as a qualified route when the alternative route is discovered with respect to the request; and transferring the route error notification from another terminal to the transmission source shown in the address list when the alternative route is not discovered with respect to the request. Accordingly, the alternative route is searched when the route can not be discovered in a lower stream terminal than this terminal, this discovered alternative route is switched as a qualified route when the alternative route is discovered, and the route error notification is transferred to a terminal of an upper stream than this terminal in order to urge the discovery of the alternative route when the alternative route can not be discovered.

Further, a program of the present invention is a program to make a terminal provided with a route table in which a destination address of communication, the next transfer destination address to reach the destination address, a link state of a link connecting to the transfer destination address, and an address list of a transmission source that transmits the communication directed to the destination address to this terminal are made to correspond and are retained as a route entry, execute the procedures of: monitoring a state of the link and updating the link state; transmitting route information on the link to the transmission source shown in the address list when the link state becomes a stretched state; transmitting an alternative route discovery request with respect to the corresponding destination address to further another terminal, when the link state become the stretched state; and transmitting a route error notification to the transmission source shown in the above-described address list when the request fails. Accordingly, the link state is notified to make the transmission data retained in the data buffer in preparation for a route switching and at the same time the alternative route is searched when the link on the route becomes the stretched state, and then the discovery of the alternative route is urged in a terminal of an upper stream than this terminal by transmitting the route error notification when the search fails.

Further, the program of the present invention is a program to make a terminal provided with a data buffer execute the procedures of: retaining data being transmitted to another terminal in the data buffer when route information on a link whose link state becomes a stretched state is received from another terminal during the transmission of the data to another terminal; transmitting an alternative route discovery request with respect to the above-described destination address to further another terminal when the route error notification is received from another terminal within predetermined time after receiving the route information; discarding the data retained in the data buffer when the route error notification is not received from another terminal even when the predetermined time passes after receiving the route information. Accordingly, the discovery of the alternative route is urged in a terminal of an upper stream than this terminal by transmitting the route error notification when the search with respect to the alternative route fails, and the data that becomes unnecessary is discarded from the data buffer when the search for the alternative route is presumed to be successful.

Further, the program of the present invention is a program to make a terminal provided with a route table in which a destination address of communication, the next transfer destination address to reach the destination address, a link state of a link connecting to the transfer destination address, and an address list of a transmission source that transmits the communication directed to the destination address to this terminal are made to correspond and are retained as a route entry, and a data buffer, execute procedures of: retaining data being transmitted to another terminal in the data buffer when route information on a link whose link state becomes a stretched state is received from the another terminal during the transmission of the data to the another terminal; transmitting an alternative route discovery request for the destination address to further another terminal when a route error notification is received from another terminal within predetermined time after receiving the route information; transmitting a command to switch to this discovered alternative route as a qualified route when the alternative route is discovered with respect to the request; and transferring the route error notification from another terminal to the transmission source shown in the address list when the alternative route is not discovered with respect to the above-described request. Accordingly, the alternative route is searched when the route can not be discovered in a terminal of a lower stream than this terminal, this discovered alternative route is switched as the qualified route when the alternative route is discovered, and the discovery of the alternative route is urged by transferring the route error notification to a terminal of an upper stream than this terminal when the alternative route can not be discovered.

In order to solve the above-described problems, a wireless ad hoc communication system of the present invention is formed of a plurality of terminals and includes: a first intermediate terminal that transmits an alternative route discovery request when the quality of a link connected to this terminal deteriorates between a source terminal that transmits communication data and a destination terminal that receives the communication data, and a second intermediate terminal that sets a possible alternative route when the request is received, wherein the first intermediate terminal transmits a command to switch the route after the possible alternative route is set, and the second intermediate terminal switches to the possible alternative route as a qualified route when the command is received. Accordingly, the possible alternative route is set from the destination terminal to the source terminal and the route switching is obtained promptly by using the quality deterioration of the link as a trigger.

Further, the wireless ad hoc communication system of the present invention is formed of a plurality of terminals and includes: a source terminal that transmits communication data, a destination terminal that receives the communication data, a first intermediate terminal that transmits an alternative route discovery request when the quality of a link connected to this terminal deteriorates during transfer of the communication data between the source terminal and the destination terminal, and a second intermediate terminal that sets a possible alternative route to the transmission terminal when the request is received and transfers this request to further another terminal, wherein the destination terminal transmits a reply to the request when the request is received, the second intermediate terminal sets the possible alternative route to the destination terminal when the reply is received and transfers this reply to further another terminal, the first intermediate terminal transmits a first command to switch the route after the reply is received, the second terminal switches to the possible alternative route to the destination terminal as a qualified route when the first command is received and transfers this first command to further another terminal, the destination terminal transmits a second command to switch when the first command is received, and the second intermediate terminal switches to the possible alternative route to the source terminal as the qualified route when the second command is received and transfers the second command to further another terminal. Accordingly, the possible bidirectional alternative route is set between the source terminal and the destination terminal and the route switching is obtained promptly by using the quality deterioration of the link as a trigger.

Further, a terminal of the present invention includes: a route table in which a destination address of communication, the next transfer destination address to reach the destination address, and a link state of a link connecting to the transfer destination address are made to correspond and are retained as a route entry; means for monitoring a state of the link and for updating the link state; and means for transmitting to another terminal an alternative route discovery request with respect to the corresponding destination address, when the link state becomes a stretched state. Accordingly, the possible alternative route is set and the route switching thereafter is obtained promptly by using the quality deterioration of the link as a trigger.

Further, the terminal of the present invention includes: a route table in which a destination address of communication, the next transfer destination address to reach the destination address, and a link state of a link connecting to the transfer destination address are made to correspond and are retained as a route entry; means for receiving an alternative route discovery request from another terminal; and means for setting a link state of an alternative route to a source address in the request as a candidate state into the above-described route table. Accordingly, the possible alternative route is set to the transmission source of the alternative route discovery request.

Further, the terminal of the present invention includes: a route table in which a destination address of communication, the next transfer destination address to reach the destination address, and a link state of a link connecting to the transfer destination address are made to correspond and are retained as a route entry; means for receiving from another terminal a command to switch to an alternative route; and means for setting an route, whose link state is a candidate state, to the destination address in the command as a valid state into the route table. Accordingly, switching to the possible alternative route set in advance as a qualified route is promptly performed.

Further, a processing method of the present invention is a processing method in a terminal provided with a route table in which a destination address of communication, the next transfer destination address to reach the destination address, and a link state of a link connecting to the transfer destination address are made to correspond and are retained as a route entry, including the steps of: monitoring a state of the link and updating the link state; transmitting to another terminal an alternative route discovery request with respect to the corresponding destination address, when the link state becomes a stretched state; and transmitting a command to switch to the discovered alternative route as a qualified route. Accordingly, the possible alternative route is set and the route switching is obtained promptly by using the quality deterioration of the link as a trigger.

Further, the processing method of the present invention is a processing method in a terminal provided with a route table in which a destination address of communication, the next transfer destination address to reach the destination address, and a link state of a link connecting to the transfer destination address are made to correspond and are retained as a route entry, including the steps of: receiving an alternative route discovery request from another terminal; setting a link state of an alternative route to a source address in the request as a candidate state into the route table; transmitting a reply to this request when the destination address in the request is an address of this terminal and transferring this request to another terminal when the destination address in the request is not the address thereof. Accordingly, the possible alternative route to the transmission source of the alternative route discovery request is set.

Further, the processing method of the present invention is a processing method in a terminal provided with a route table in which a destination address of communication, the next transfer destination address to reach the destination address, and a link state of a link connecting to the transfer destination address are made to correspond and are retained as a route entry, including the steps of: receiving a command to switch to an alternative route from another terminal; setting a route to the destination address in the command as an invalid state into the route table when there is a route whose link state is a stretched state or a valid state; and setting the route, whose link state is a candidate state, to the destination address in the command as the valid state into the route table. Accordingly, switching to the possible alternative route set in advance as a qualified route is performed promptly.

Further, the program of the present invention is a program to make a terminal provided with a route table in which a destination address of communication, the next transfer destination address to reach the destination address, and a link state of a link connecting to the transfer destination address are made to correspond and are retained as a route entry execute the procedures of: monitoring a state of the link and updating the link state; transmitting to another terminal an alternative route discovery request with respect to the corresponding destination address, when the link state becomes a stretched state; and transmitting a command to switch to the discovered alternative route as a qualified route. Accordingly, the possible alternative route is set and the route switching is obtained promptly by using the quality deterioration of the link as a trigger.

Further, the program of the present invention is a program to make a terminal provided with a route table in which a destination address of communication, the next transfer destination address to reach the destination address, and a link state of a link connecting to the transfer destination address are made to correspond and are retained as a route entry execute the procedures of: receiving an alternative route discovery request from another terminal; setting a link state of an alternative route to a source address in the request as a candidate state into the route table; and transmitting a reply to the request when the destination address in the request is the address of this terminal and transferring the request to another terminal when the destination address in the request is not the address thereof. Accordingly, the possible alternative route to the transmission source of the alternative route discovery request is set.

Furthermore, the program of the present invention is a program to make a terminal proved with a route table in which a destination address of communication, the next transfer destination address to reach the destination address, and a link state of a link connecting to the transfer destination address are made to correspond and are retained as a route entry execute the procedures of: receiving a command to switch to an alternative route from another terminal; setting a route to the destination address in the command as an invalid state into the table when there is a route whose link state is a stretched state or a valid state; and setting the route, whose link state is a candidate state, to the destination address in the command as a valid state into the route table. Accordingly, switching to the possible alternative route set in advance as a qualified route is promptly performed.

BRIEF DESCRIPTION OF DRAWINGS

FIG. 5 is a diagram showing a configuration example of a route table 610 retained in the wireless terminal 100 in the embodiment of the present invention;

FIG. 18 is a diagram showing a route when a terminal B transfers the request of the alternative route and the contents of the route table 610 in each terminal;

BEST MODE FOR CARRYING OUT THE INVENTION

Next, embodiments of the present invention are explained in detail by referring to the accompanied drawings.

Figure 1A:
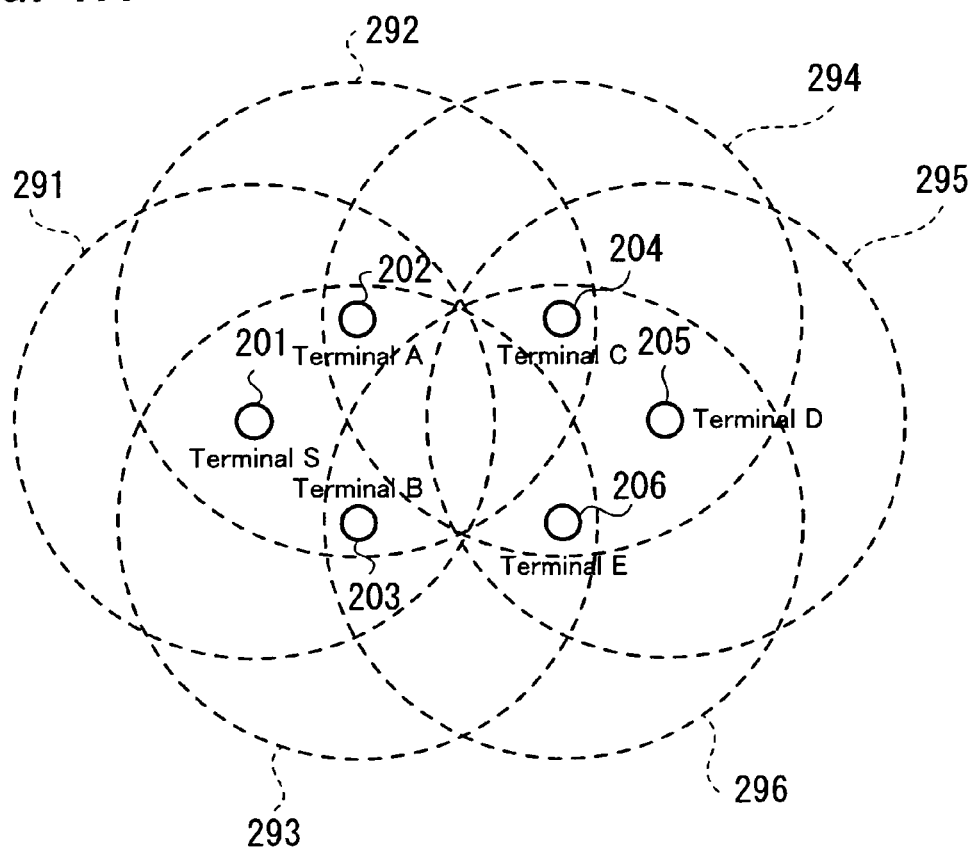
FIGS. 1A and 1B are diagrams showing an example of a wireless ad hoc network that is assumed in a wireless ad hoc communication system according to an embodiment of the present invention.

FIG. 1 is a diagram showing an example of a wireless ad hoc network that is assumed in a wireless ad hoc communication system according to the embodiment of the present invention. In an example of this FIG. 1A, six terminals of a terminal S (201) through a terminal E (206) constitute a network of the wireless ad hoc communication system. In addition, a dotted line around each terminal indicates communication ranges 291 through 296 of the terminals 201 through 206, respectively.

For example, the terminal A (202) and terminal B (203) are included in the communication range 291 of the terminal S (201). In addition, the terminal S (201), terminal B (203), and terminal C (204) are included in the communication range 292 of the terminal A (202). Also, the terminal S (201), terminal A (202), and terminal E (206) are included in the communication range 293 of the terminal B (203). Also, the terminal A (202), terminal D (205), and terminal E (206) are included in the communication range 294 of the terminal C (204). Moreover, the terminal C (204) and terminal E (206) are included in the communication range 295 of the terminal D (205). Further, the terminal B (203), terminal C (204), and terminal D (205) are included in the communication range 296 of the terminal E (206).

Figure 1B:
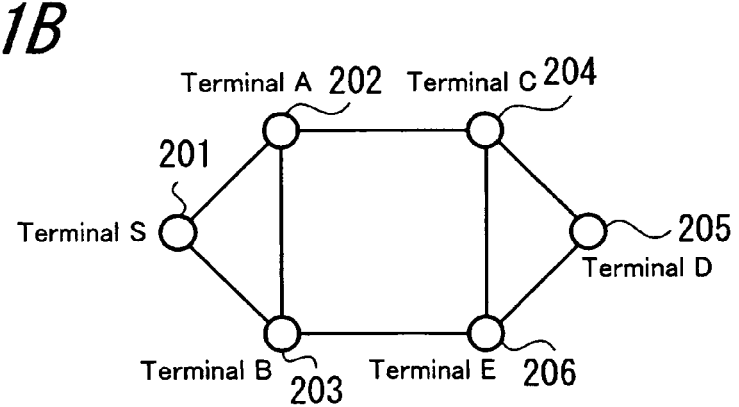

FIG. 1B schematically shows such a relation among the terminals. In FIG. 1B, terminals existing within the communication ranges of 291 through 296 are mutually connected by lines. Therefore, it is understood that communication should be performed by a plurality of hops through other terminals when the communication is performed between terminals that are not connected directly.

Figure 2A:
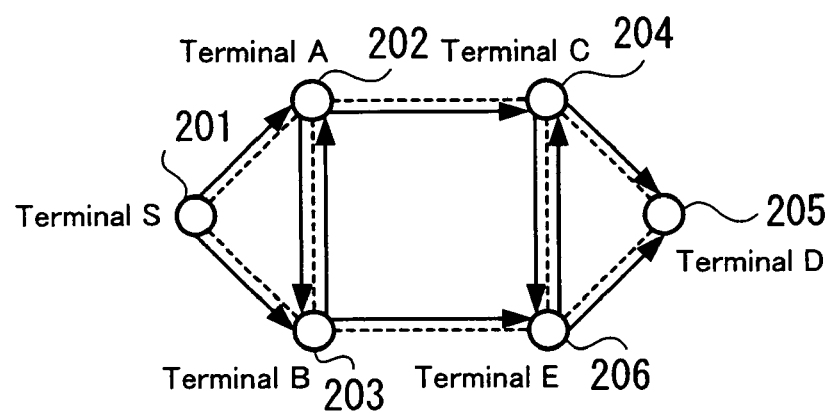
FIGS. 2A and 2B are diagrams showing a procedure for setting a route in the wireless ad hoc network according to the example of FIG. 1.
Figure 2B:
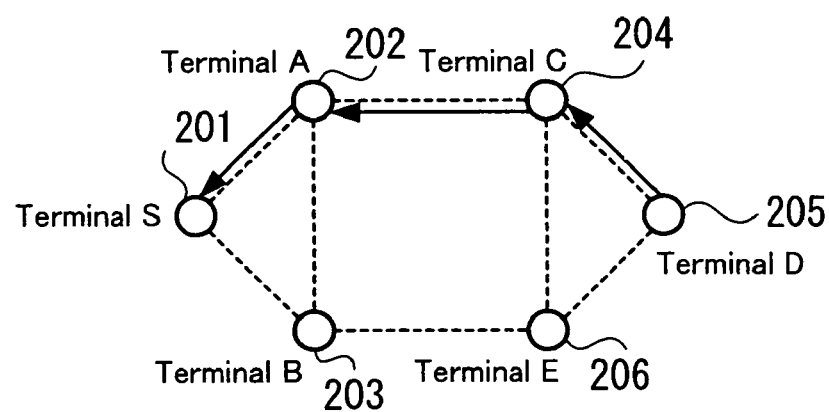

FIGS. 2A and 2B are diagrams showing a procedure for setting a route in the wireless ad hoc network according to the example of FIG. 1. In the case where a route is not yet set between certain terminals, the prior art can be used as a procedure for setting the route at the beginning. For example, in the above-described AODV protocol, a route is set by transmitting a route request message from a source terminal to a destination terminal and by transmitting a route reply message from the destination terminal to the source terminal.

FIG. 2A shows a flow of a packet when a route request is made from the terminal S (201) to the terminal D (205). The terminal S enters a route discovery process if a route to the terminal D is not yet set at the time of transmitting data to the terminal D. First, the terminal S broadcasts a route request message (Route REQuest message: RREQ). The terminal A (202) and terminal B (203) receiving this route request message set a reverse path (Reverse Path) to the terminal S that is a transmission source of the route request message. Here, the reverse path means a path in which a neighbor terminal having transmitted the route request message is made into the next transfer destination when there arises a request that data is to be transmitted to the transmission source of the route request message.

The terminal A and terminal B which have received the route request message further broadcast the route request message since a destination is not these terminals. Hence, the route request message is conveyed to the terminal C (204) and terminal E (206). On the other hand, the route request message broadcasted by the terminal A is also received in the terminal S and terminal B, however, the received message is discarded in the terminal S and terminal B since a request identifier attached to the route request message matches. Similarly, the route request message broadcasted by the terminal B is discarded in the terminal S and terminal A. Thus, the request identifier is used for checking duplicated receipt.

The terminal C and terminal E which have received the route request message further broadcast the route request message after setting a reverse path to the terminal S. Hence, the route request message reaches the terminal D (205). Although the terminal D receives the route request messages from both of the terminal C and the terminal E, the route request message which is received later is discarded.

FIG. 2B shows a flow of a packet when a route reply is made from the terminal D to the terminal S. The terminal D transmits a route reply message (Route REPly message: RREP) by a uni-cast to the terminal S that is the transmission source, after setting the reverse path to the terminal S. For example, when the terminal D replies to the route request message from the terminal C, the terminal D transmits the reply by the uni-cast to the terminal C as a next transmission destination.

The terminal C having received the route reply message sets a reverse path to the terminal D that is the transmission source of the route reply message. Then, the terminal C transfers the route reply message to the terminal A. Similarly, the terminal A having received the route reply message sets a reverse path to the terminal D that is the transmission source of the route reply message, and transfers the route reply message to the terminal S.

The terminal S having received the route reply message sets a reverse path to the terminal D that is the transmission source of the route reply message. Hence, the route discovery process is completed.

Figure 3:
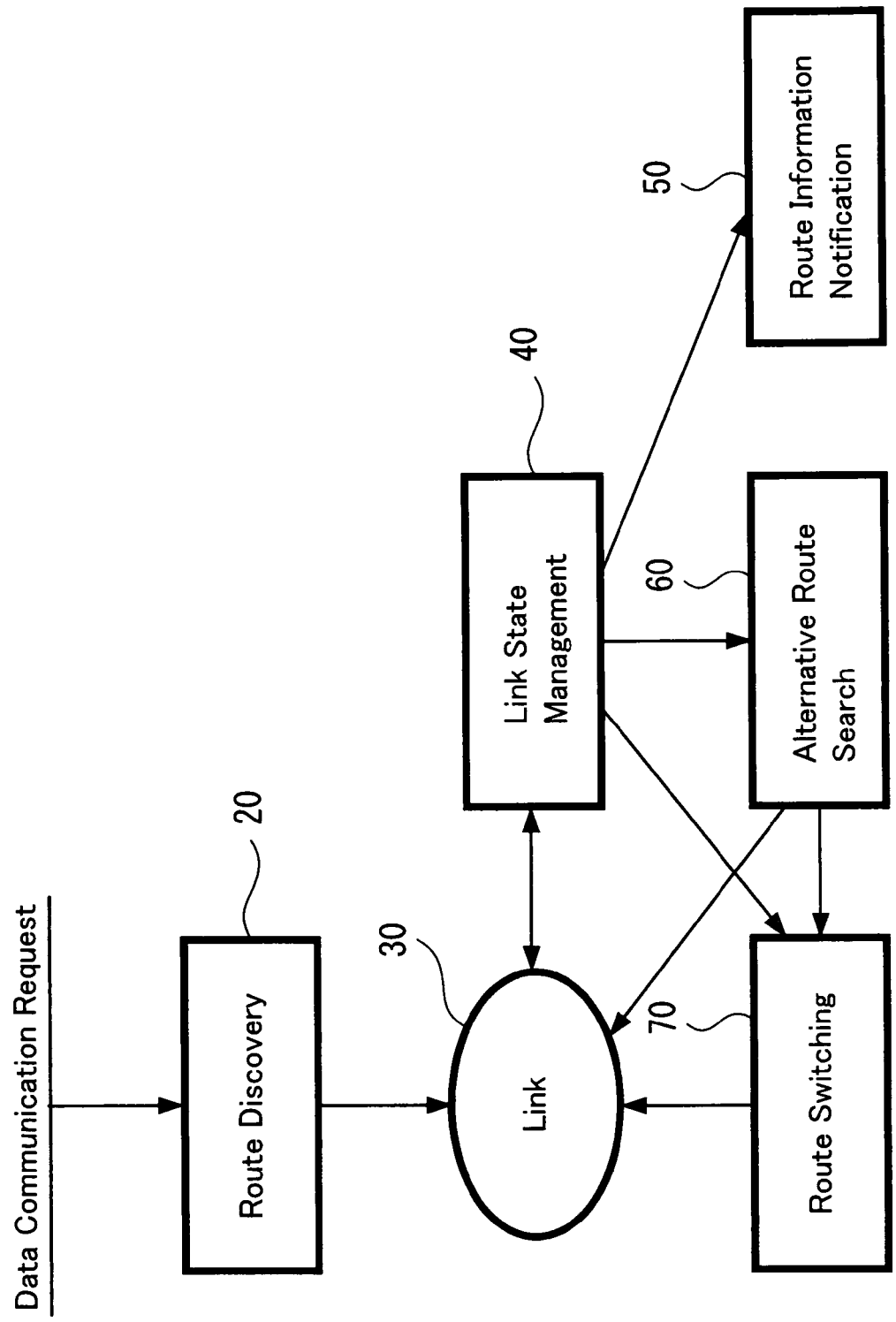
FIG. 3 is a diagram showing an outline of processing in the embodiment of the present invention.

FIG. 3 is a diagram showing an outline of processing in the embodiment of the present invention. As already explained in FIG. 2, if the route to the destination address is not yet set when a data communication request 10 is generated, the terminal enters a route discovery process 20. Hence, the route is set between terminals. The route among terminals is formed by passing through at least one link 30 that mutually connects the terminals.

After the route is set, the link is monitored by a link state management process 40. Specifically, an item called a link state in a route entry of a route table in each terminal is updated appropriately. Each terminal retains information on a link for connecting thereto in the route table as described later, and this route table is updated whenever the link state changes. Accordingly, each terminal can obtain the latest link state without fail.

When the link state of the route being used becomes a predetermined state, this link state is notified to the transmission source in a route information notification process 50. For example, when the quality of the link deteriorates due to some reason, a terminal on the transmission side connecting to the link transmits a route information notification to the transmission source. A terminal having received this route information notification starts retaining data in a data buffer provided therein. In addition, this route information notification is transferred successively between each terminal toward the transmission source.

When the link state of the route being used becomes the predetermined state, an alternative route is searched in an alternative route search process 60. For example, when the quality of the link deteriorates due to some reason, the terminal on the transmission side connecting to the link transmits a route request in order to discover an alternative route. The terminal which has transmitted the route request receives a route reply in accordance with a predetermined procedure, and thereby a possible alternative route is set.

However, when an appropriate alternative route is not discovered for this route request, a route error is transmitted to the next terminal on the route toward the transmission source. Then, a terminal that has received this route error transmits a route request in order to discover an alternative route. When an appropriate alternative route is not discovered even by this request, the route error is transferred further to the following terminal on the route toward the transmission source and a similar procedure is repeated until an alternative route is discovered.

When the link state of the route being used becomes the predetermined state after the possible alternative route is set, a switching to the alternative route is made in a route switching process 70. For example, when the quality of the link is further deteriorated and a break of the link is about to occur due to the same reason, the terminal having made the possible alternative route set gives another terminal a command to switch to the possible alternative route as a qualified route. With this, the alternative route becomes the qualified route to the destination terminal.

Next, a configuration example of a wireless terminal in the embodiment of the present invention is explained by referring to the accompanied drawing.

Figure 4:
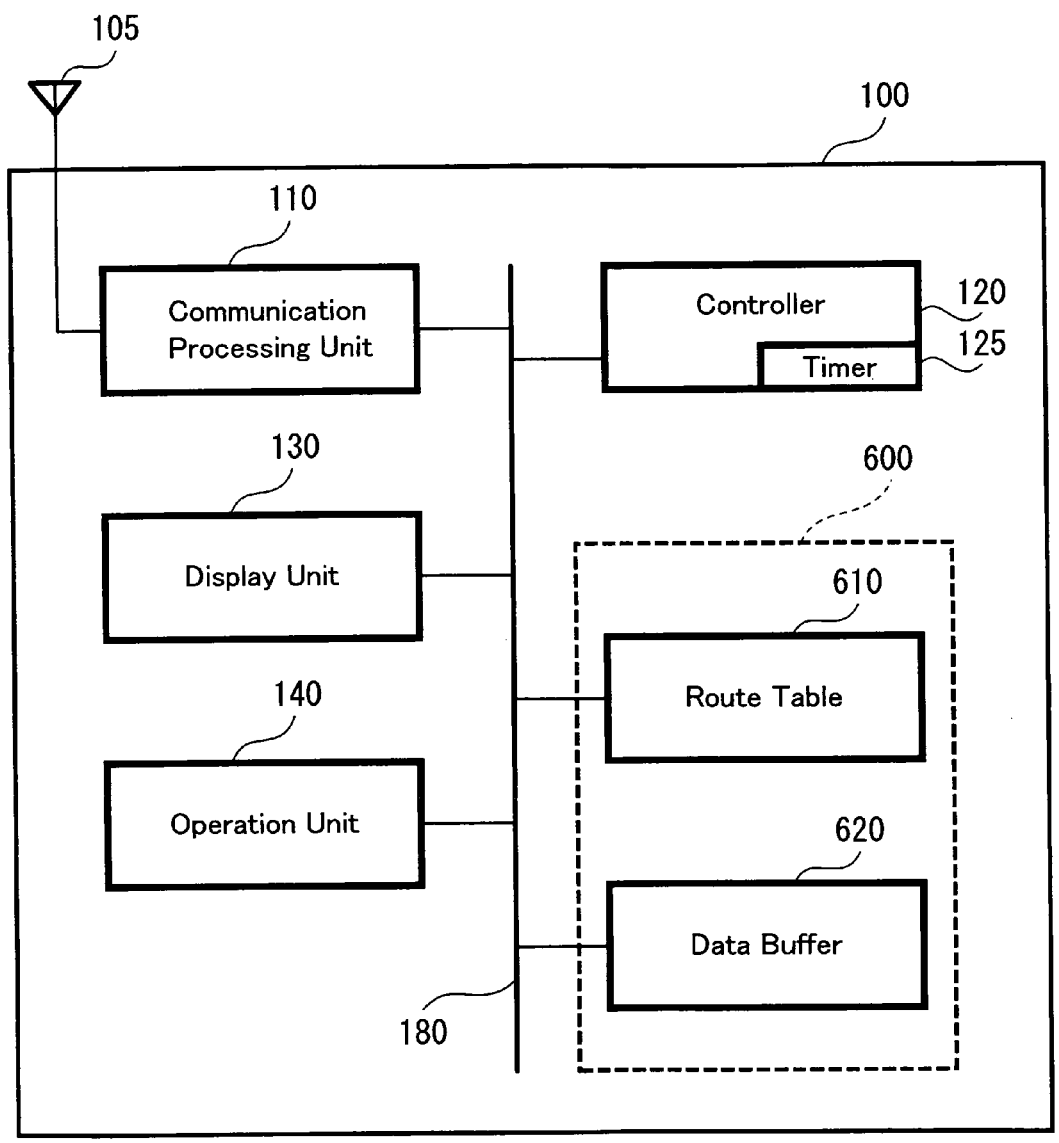
FIG. 4 is a diagram showing an configuration example of a wireless terminal 100 in the embodiment of the present invention.

FIG. 4 is a diagram showing a configuration example of a wireless terminal 100 in the embodiment of the present invention. This wireless terminal 100 includes a communication processing unit 110, a controller 120, a display unit 130, an operation unit 140, and a memory 600, which are mutually connected by a bus 180. In addition, an antenna 105 is connected to the communication processing unit 110. The communication processing unit 110 makes a frame of a network interface layer (data link layer) from a signal that is received through the antenna 105. Further, the communication processing unit 110 transmits the frame of the network interface layer through the antenna 105. Also, the communication processing unit 110 detects a signal/noise ratio (S/N ratio) with respect to the signal received through the antenna 105 and notifies to the controller 120.

The controller 120 controls the whole of the wireless terminal 100. For example, predetermined processing is performed by referring to the frame made by the communication processing unit 110. The controller 120 has a timer 125 and measures time. In addition, the controller 120 calculates an error rate of a frame or packet.

The display unit 130 is provided to display predetermined information, and a liquid crystal display or the like is used, for example. The operation unit 140 is provided to make an operation command to the wireless terminal 100 from the outside, and a keyboard, button switch, or the like is used, for example.

The memory 600 is provided to retain data necessary for an operation of the controller 120, and contains a route table 610 to retain information on a route for connecting this terminal and a data buffer 620 to retain data that is transmitted to another terminal as explained in the followings.

FIG. 5 is a diagram showing a configuration example of the route table 610 retained in the wireless terminal 100 in the embodiment of the present invention. The route table 610 retains as a route entry a destination address 611, a transfer destination address 612, the number of destination hops 613, a link state 614, a sequence number 615, an owner 616, and a preceding list 617. The destination address 611 shows an address of a final destination terminal of that route. Here, the address is only required to be the one which identifies a terminal uniquely, and a MAC (Media Access Control) address, IP (Internet Protocol) address, or the like can be used, for example. The transfer destination address 612 shows an address of the next terminal for transfer in order to reach the corresponding destination address 611.

The number of destination hops 613 shows the number of necessary links in order to reach the corresponding destination address 611. For example, in case of the example of FIG. 1B, the number of hops becomes 2, because it is necessary to pass two links in total through the terminal A along the path to reach the terminal S from the terminal C. The link state 614 shows a state of a link with respect to a link to the corresponding transfer destination address 612. This link state will be explained later.

The sequence number 615 is provided to avoid a loop that might be generated between a route formed in the past and a route newly formed. It is possible to judge which route is the newly formed one by numerically comparing a size of this sequence number 615.

The owner 616 shows an owner of a corresponding link. Since terminals connected to one link exist on both ends (which means two) of the link, there is a possibility that two terminals starts an action all at once when a change occurs in a state of the link. Then, an owner is appointed to each link so that the owner has a responsibility to manage the link. It is necessary to appoint uniquely which terminal becomes the owner. For example, it is possible to compare the IP addresses (or, MAC addresses) by numerical values and to set a owner flag of that route to the larger one at a stage where the route is set. In addition, it is also possible to determine based on the number of neighbor terminals, the performance of the terminal, and the like other than the numerical size of the address. Since a possibility of possessing a plurality of alternative routes is high in a node having many neighbor terminals and since calculation costs spent on a process for a discovery of an alternative route become low in a terminal having a high performance, those node and terminal are considered to be eligible as the owner of the route. Here, in the example of FIG. 5, a case of being a owner is indicated as "1" and a case of being not an owner is indicated as "0".

The preceding list 617 is one that shows an address group of terminals in a reverse direction to the destination address 611 on that route. For example, in the case where there is a route directed to the terminal S from the terminal D through the terminal C and further through the terminal A, the preceding list 617 of the route entry, in which the terminal S is the destination address 611 and the terminal A is the transfer destination address 612, contains the terminal D in the route table 610 of the terminal C. Here, when there is additionally a flow of data directed to the terminal S from a terminal X through the terminal C and further through the terminal A, for example, that preceding list 617 further contains the terminal X.

Next, a state transition of a link state in the embodiment of the present invention is explained by referring to the accompanied drawing.

Figure 6:
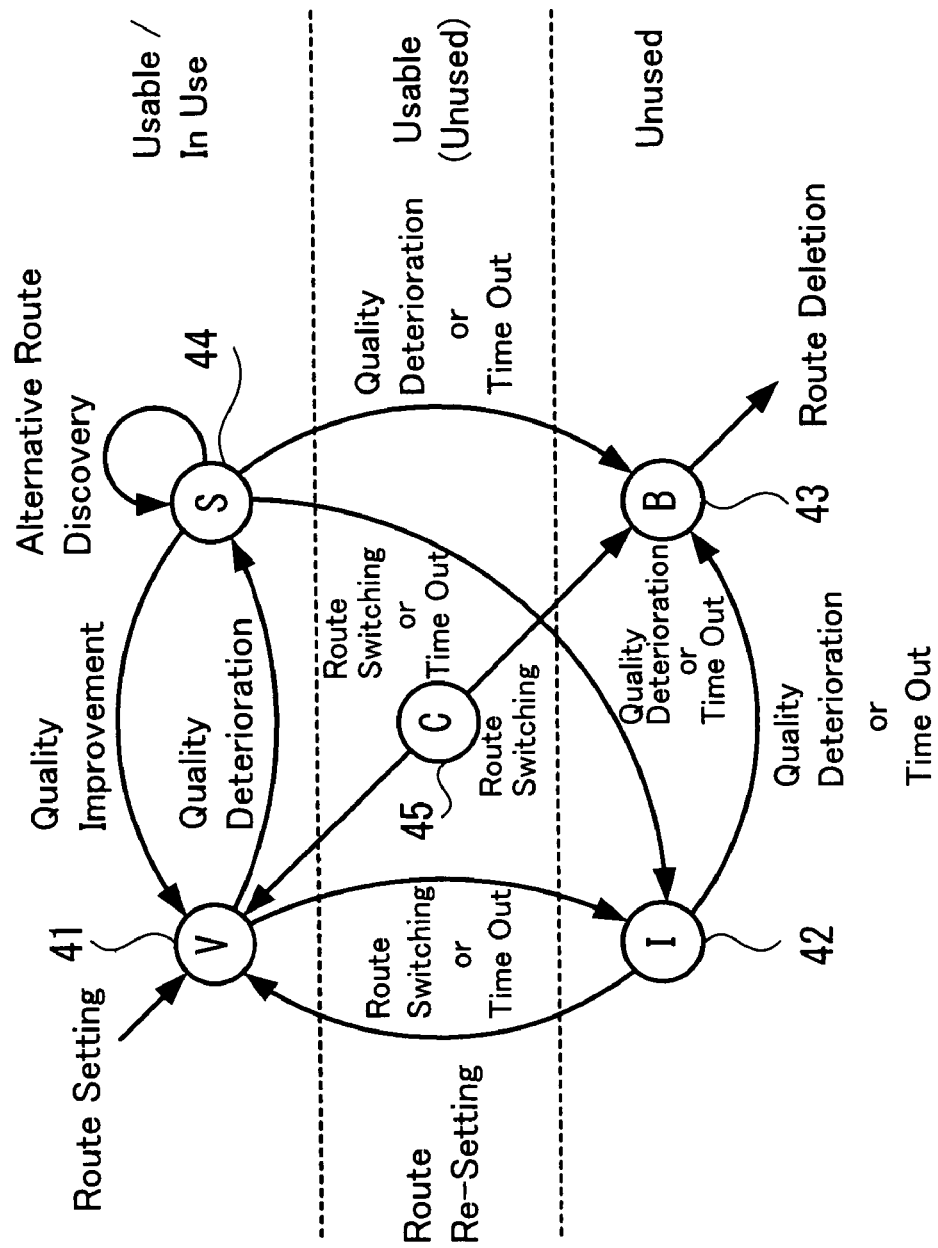
FIG. 6 is a diagram showing an example of a state transition in a link state management process 40 according to the embodiment of the present invention.

FIG. 6 is a diagram showing an example of a state transition in the link state management process 40 according to the embodiment of the present invention. As a link state, it is assumed that there are five kinds of state: a valid state (V-state: Valid) 41, an invalid state (I-state: Invalid) 42, a break state (B-state: Break) 43, a stretched state (S-state: Stretched) 44, and a candidate state (C-state: Candidate) 45.

The valid state 41 is a state of being set as a qualified route. The invalid state 42 is a state where although not used as a route, the route entry is retained in the route table 610. On the other hand, the break state 43 is a state where the route is not used either, and the route entry is already deleted from the route table 610. With this break state 43 being assumed, the route entry can be minimized to increase an available memory and management costs can be reduced.

The stretched state 44 is the state where a link having been the valid state 41 until then becomes unstable due to a deterioration of the link quality. For example, a case where a reception state of a radio wave becomes deteriorated, a case where a radio wave becomes difficult to pass through due to shield by a human body, and the like are considered. However, it is assumed that even this stretched state 44 is not such a state that communication is completely impossible although there is some problem in the communication. The candidate state 45 is a state of being set as a possible alternative route by the alternative route search process 60, and is a state of being not yet used as a qualified route at this point of time although this route is usable.

First, a route becomes the valid state 41 when the route is set in the route discovery process 20, but thereafter a transition is made to the stretched state 44 when the quality of the link deteriorates. Further, when predetermined time passes without using the route in the valid state 41, a transition is made to the invalid state 42 as time out. Further, when the alternative route switches to the qualified route, with respect to the former link of the valid state 41 a transition is made to the invalid state 42.

When the route turns to the stretched state 44, an alternative route is discovered by the alternative route search process 60. When the alternative route switches to the qualified route, with respect to the former link of the stretched state 44 a transition is made to the invalid state 44. Further, when the predetermined time passes without using the route in the stretched state 44, a transition is made to either the invalid state 42 or break state 43 with the time out. Note that a transition is made to the break state 43 when the quality of the link further deteriorates in the stretched state 44 such that the link becomes a state completely incapable of performing the communication, but the route again returns to the valid state 41 when the quality of the link becomes improved.

When the alternative route switches to the qualified route in the candidate state 45, a transition is made to the valid state 41. On the other hand, when the quality of the link is further deteriorated in the candidate state 45 such that the link becomes a state completely incapable of performing the communication, or when the predetermined time passes without being used, a transition is made to the break state 43 with time out and the route is deleted from the route table 610.

Further, when the quality of the link deteriorates further in the invalid state 42 such that the link becomes a state completely incapable of performing the communication, or when the predetermined time passes while leaving the route unused, a transition is made to the break state 43 and is deleted from the route table 610. On the other hand, it is assumed that with respect to the valid state 41 a transition to the stretched state 44 is made without fail and the transition is not directly made to the break state 43 even when the quality deteriorates abruptly to a level where the communication is not possible.

Note that whether the quality of the link is excellent or not in this state transition is judged by the controller 120 based on a signal/noise ratio of a physical layer that is detected by the communication processing unit 110 and an error rate of a MAC sub-layer that is calculated by the controller 120. In addition, the judgment of the time out is made on the basis of the timer 125 of the controller 120.

Next, a packet configuration in the embodiment of the present invention is explained by referring to the accompanied drawing.

Figure 7:
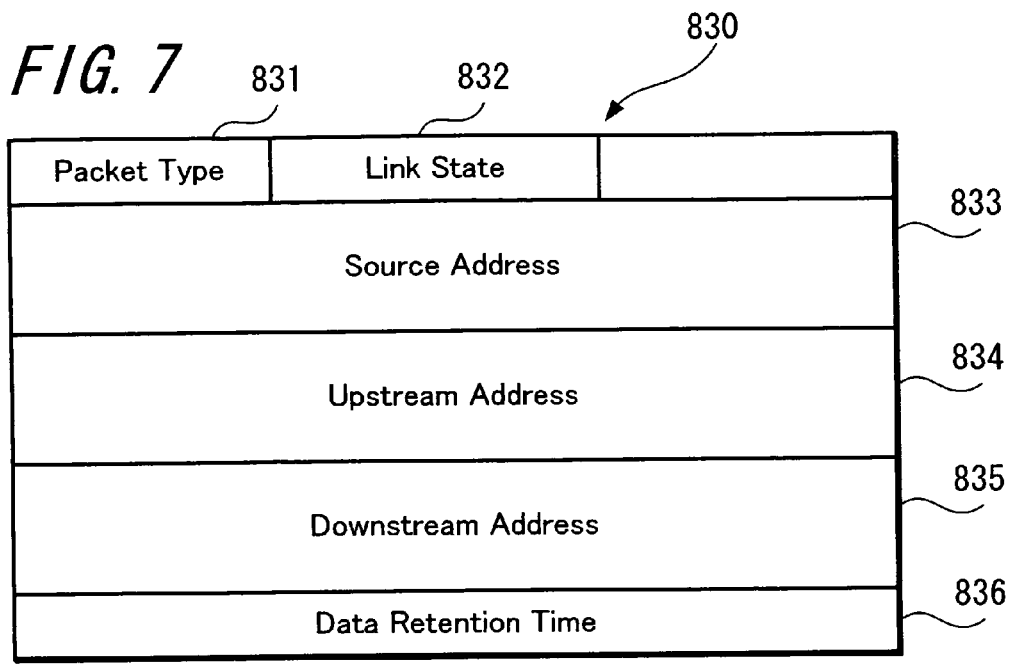
FIG. 7 is a diagram showing a configuration example of a route information notification packet 830 that is used in a route information notification process 50 according to the embodiment of the present invention.

FIG. 7 is a diagram showing a configuration example of a route information notification packet 830 that is used in the route information notification process 50 according to the embodiment of the present invention. When with respect to the link state 614 in the route table 610 a transition is made from the valid state (V-state) 41 to the stretched state (S-state) 44, the route information notification packet 830 is transmitted by a terminal on the transmission side, which is connected to the link. This route information notification packet 830 contains a packet type 831, a link state 832, a source address 833, an upstream address 834, a downstream address 835, and a data retention time 836.

The packet type 831 is a field that indicates a type of a packet, and in case of this route information notification packet 830, it is indicated that this packet is the route information notification packet. The link state 832 is a field that indicates a present link state of that link. In the embodiment of the present invention, either one of the valid state (V-state) 41 or stretched state (S-state) 44 is assumed as this link state 832, but transmission may be made possible even in a state other than the above-described states.

The source address 833 is a field that indicates an address of a terminal which transmits data using that route. The upstream address 834 and downstream address 835 are fields that indicate addresses of terminals which specify a link having the link state 832. Specifically, the upstream address 834 is a terminal on the transmission side which is connected to that link and indicates an address of a terminal that transmits the route information notification packet 830. Also, the downstream address 835 is a terminal on the reception side which is connected to that link, and indicates an address of a terminal corresponding to the next hop of the terminal that transmits the route information notification packet 830.

The data retention time 836 is a field that designates how long a terminal having received the route information notification packet 830 should retain data under transmission in the data buffer 620 (FIG. 4). For example, it is possible to indicate that data should be retained for a duration from several milliseconds to several seconds. On the other hand, when data should not be retained, a value "0" is set in this data retention time 836. When a route error message is not received during a period of this data retention time 836 after receiving the route information notification packet 830, the wireless terminal 100 discards the data retained in the data buffer 620.

Figure 8:
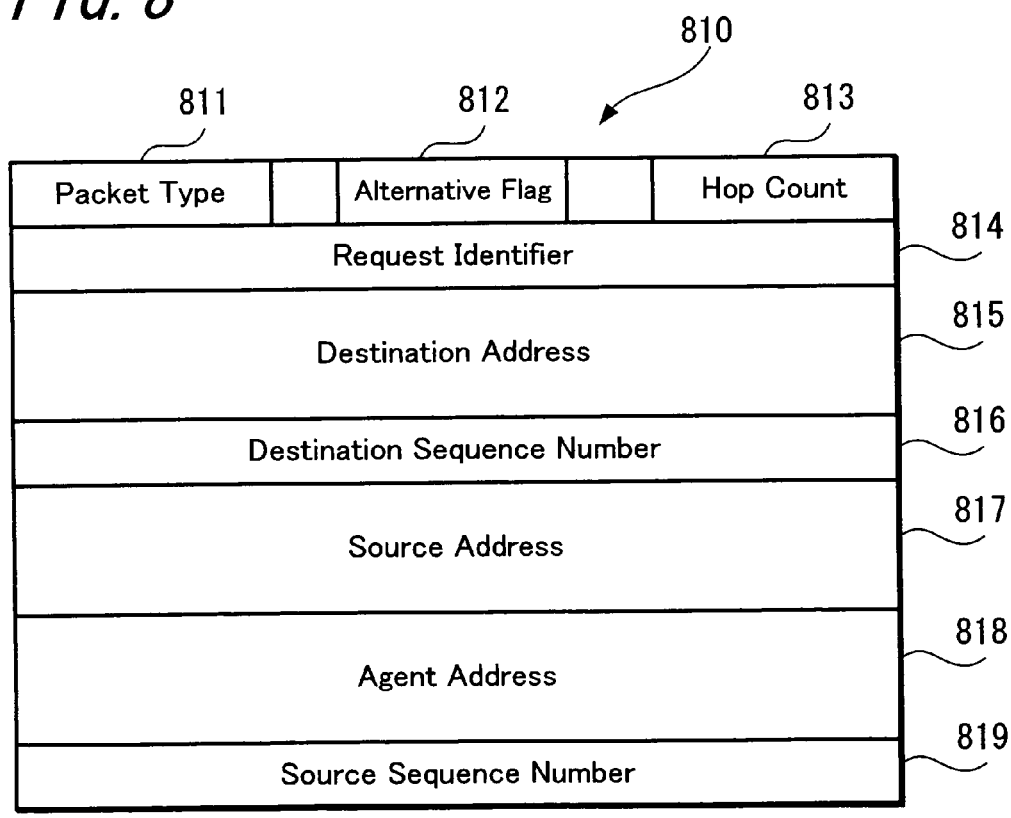
FIG. 8 is a diagram showing a configuration example of a route request packet 810 that is used in an alternative route search process 60 according to the embodiment of the present invention.

FIG. 8 is a diagram showing a configuration example of a route request packet 810 that is used in the alternative route search process 60 according to the embodiment of the present invention. When with respect to the link state 614 in the route table 610 a transition is made from the valid state (V-state) 41 to the stretched state (S-state) 44, the route request packet 810 is transmitted by a terminal on the transmission side which is connected to that link. This route request packet 810 contains a packet type 811, an alternative flag 812, a hop count 813, a request identifier 814, a destination address 815, a destination sequence number 816, a source address 817, an agent address 818, and a source sequence number 819.

The packet type 811 is a field that indicates a type of a packet, and in case of this route request packet 810, it is shown that this packet is the route request packet. The alternative flag 812 is a field that indicates whether the route request packet 810 is used for initial route setting or is used for setting a possible alternative route. For example, when the alternative flag 812 is "OFF", the packet is a normal route request and when the alternative flag is set to "ON", the packet is a particular route request for setting a possible alternative route. The route request packet 810 in which the alternative flag 812 is set is transferred to other terminals than in the stretched state 44 by multiple uni-casts. Further, in a terminal having received the route request packet 810 in which the alternative flag 812 is set, route information on a route request source is formed without being restricted by limitations on the sequence number and the number of hops which are described later.

The hop count 813 is a field that indicates the number of links passed through from the source address 817. The request identifier 814 is a field that indicates an identifier for uniquely identifying the route request relating to the route request packet 810. This request identifier 814 is not changed during a process in which the route request is transferred from the source address 817 to the destination address 815.

The destination address 815 is a field that indicates an address of a terminal that becomes a final destination of a route to be set, and this destination address 815 indicates an address of a final destination terminal of the route request packet 810. The route to the destination address 815 is set with this route request packet 810. The destination sequence number 816 is a field that indicates the maximum sequence number which a terminal on the route toward the destination address 815 has received in the past.

The source address 817 is a field that indicates an address of a terminal which becomes a start of the route to be set. This source address 817 indicates an address of a source terminal which has first transmitted the route request packet 810 when the alternative flag 812 is not set, but the source address 817 indicates the address of the source terminal which the following agent address 818 has first transmitted the route request packet 810 when the alternative flag 812 is set. The agent address 818 is a field that indicates an address of a terminal which has transmitted the route request packet 810 as an agent when the alternative flag 812 is set.

The source sequence number 819 is a field that indicates the present sequence number of the source terminal, and becomes a destination sequence number for a terminal which has set a route toward that source terminal.

Figure 9:
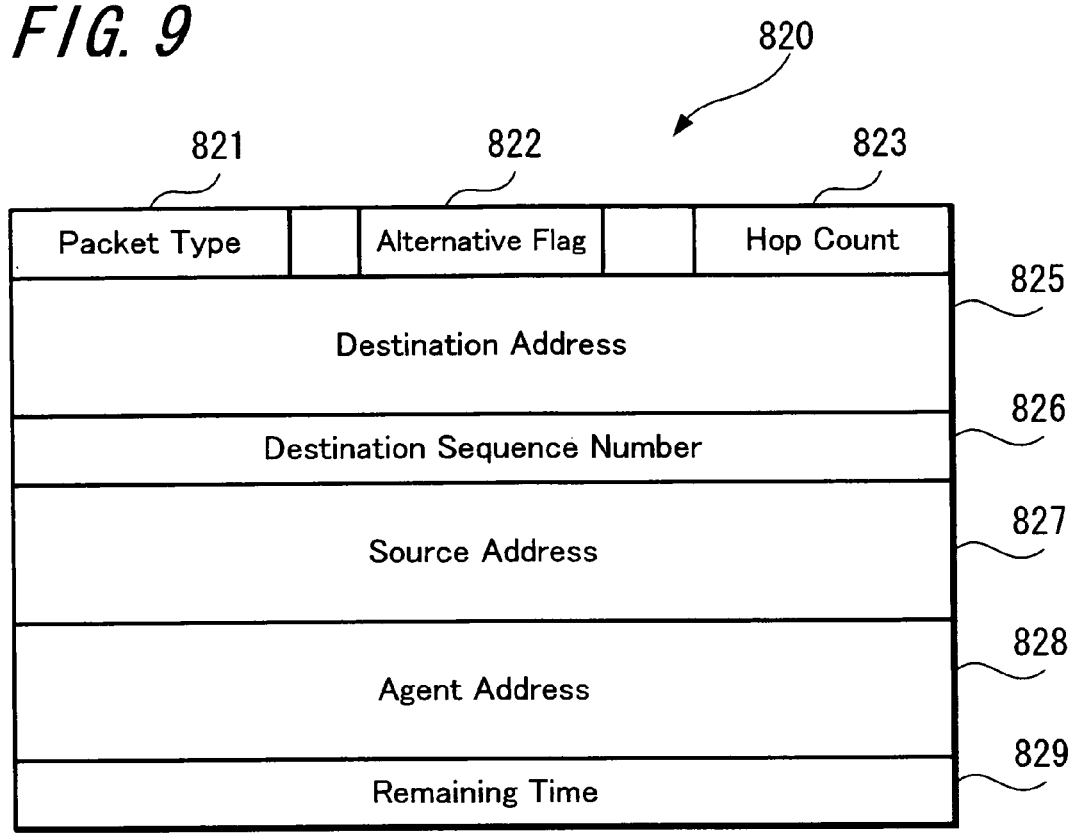
FIG. 9 is a diagram showing a configuration example of a route reply packet 820 that is used in the alternative route search process 60 according to the embodiment of the present invention.

FIG. 9 is a diagram showing a configuration example of the route reply packet 820 which is used in the alternative route search process 60 according to the embodiment of the present invention. This route reply packet 820 is transmitted by the terminal shown in the destination address 815 of the route request packet 810 as a reply to the route request packet 810. This route reply packet 820 contains a packet type 821, an alternative flag 822, a hop count 823, a destination address 825, a destination sequence number 826, a source address 827, an agent address 828, and remaining time 829.

The packet type 821 is a field that indicates a type of a packet, and in case of this route reply packet 820, it is indicated that this packet is the route reply packet. Similarly to the alternative flag 812, the alternative flag 822 is a field that indicates whether the route reply packet 820 is used for initial route setting or is used for setting a possible alternative route. The route reply packet 820 in which this alternative flag 822 is set is not transferred any further after this packet is received by the terminal shown in the agent address 818.

The hop count 823 is a field that indicates the number of links passed through from the destination address 825. The destination address 825 is a field that indicates an address of a terminal which becomes a final destination of a route to be set, and the destination address 825 indicates an address of a terminal which has transmitted route reply packet 820. The destination sequence number 826 is a field that indicates the maximum sequence number which a terminal on the route toward the destination address 825 has received in the past.

The source address 827 is a field that indicates an address of a terminal which becomes a start of the route to be set. The agent address 828 is a field that indicates an address of a terminal which becomes a final destination of the route reply packet 820 when the alternative flag 822 is set. The remaining time 829 is a field that indicates remaining time of the route, and is used to judge the above-described time out.

Figure 10:
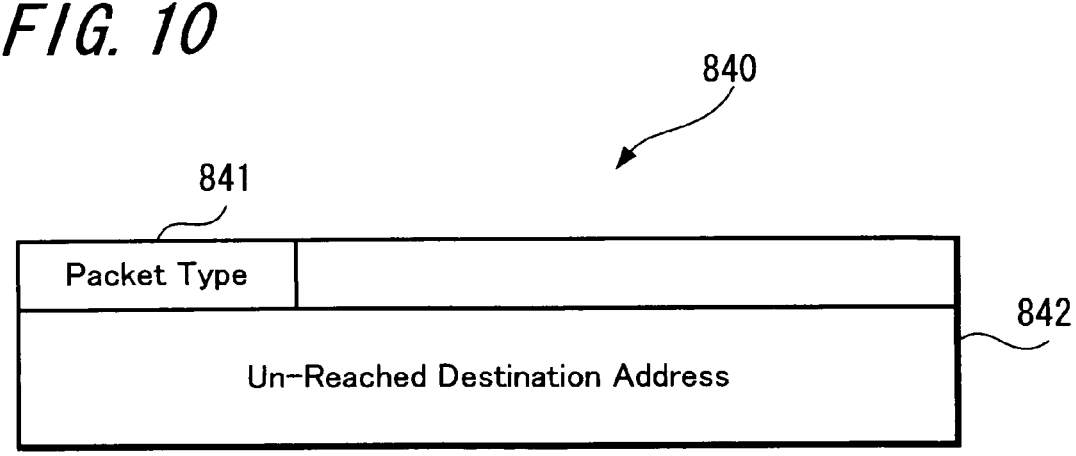
FIG. 10 is a diagram showing a configuration example of a route error packet 840 that is used in the alternative route search process 60 according to the embodiment of the present invention.

FIG. 10 is a diagram showing a configuration example of a route error packet 840 which is used in the alternative route search process 60 according to the embodiment of the present invention. This route error packet 840 is transmitted by a terminal on the transmission side which is connected to the link in the case where an alternative route is not discovered even though the alternative route is searched in the alternative route search process 60, using the quality deterioration of the link as a trigger. This route error packet 840 contains a packet type 841 and an un-reached destination address 842. The packet type 841 is a field that indicates a type of a packet, and in case of this route error packet 840, it is indicated that this packet is the route error packet.

The un-reached destination address 842 is a field that indicates a destination address of a route that can not be discovered even though an alternative route is searched in a transmission terminal of the route error packet 840. A terminal having received the route error packet 840 refers to this un-reached destination address 842, changes the link state 614 from the valid state to the stretched state in the route entry that corresponds to the destination address 611 (FIG. 5) of the route table 610, and searches an alternative route from the terminal. In the case where the alternative route can not be discovered even by this search, the link state 614 of the route entry is changed from the stretched state to the invalid state (or, deleted) and the route error packet 840 is transferred to the address written in the preceding list 617.

Figure 11:
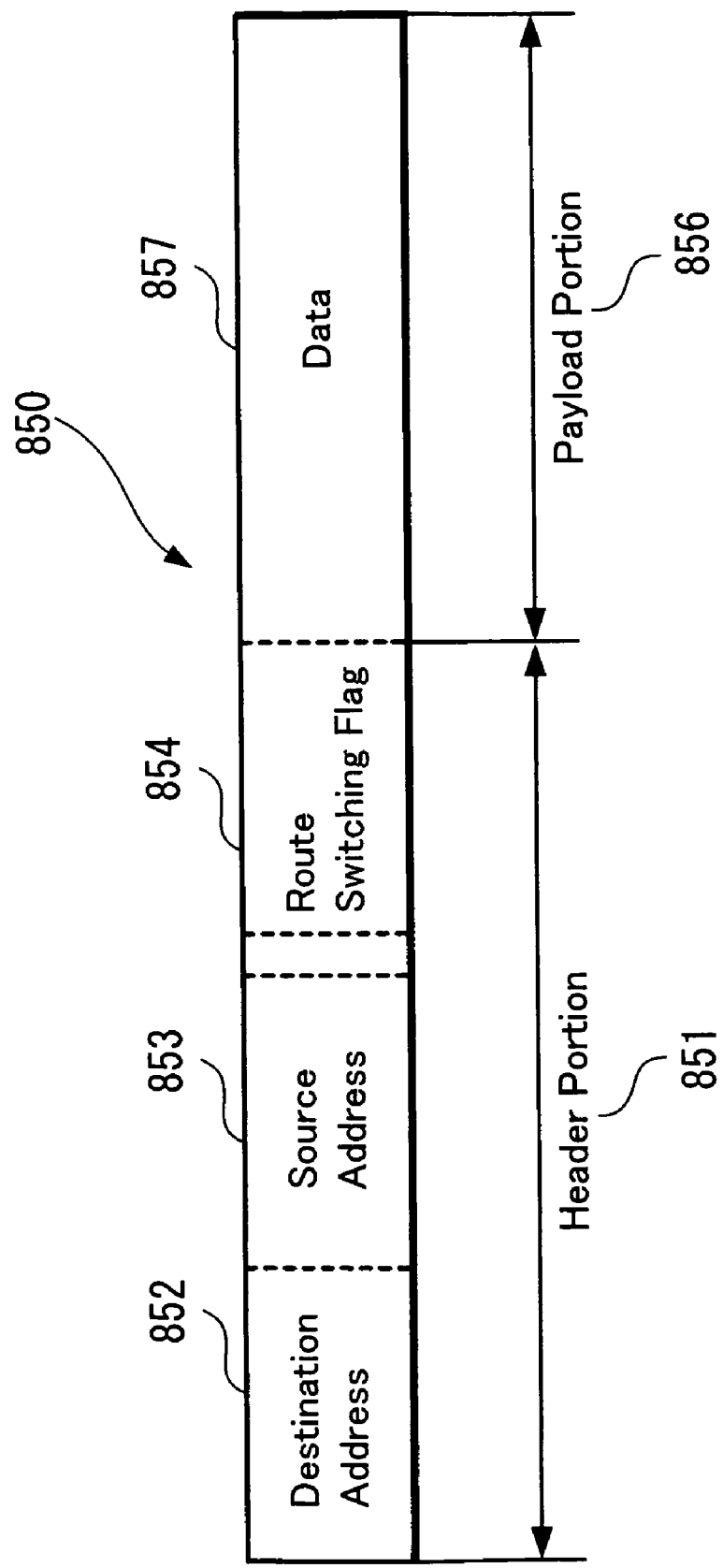
FIG. 11 is a diagram showing a configuration example of a route switching packet 850 that is used in a route switching process 70 according to the embodiment of the present invention.

FIG. 11 is a diagram showing a configuration example of the route switching packet 850 which is used in the route switching process 70 according to the embodiment of the present invention. This route switching packet 850 is transmitted by a terminal having transmitted the route request packet 810 for setting a possible alternative route in order to switch to the possible alternative route as a qualified route. A normal data packet can be used as the route switching packet 850. For example, as shown in FIG. 11, this packet can be obtained by partly changing a definition of a header portion 851 in a data packet that contains data 857 in a payload portion 856. However, in the case where a header portion can not be changed in such a case of IPv4, a data packet may be transmitted after the route switching packet 850 that contains similar information is transmitted as a control packet.

In the header portion 851 of the route switching packet 850 using the data packet, a route switching flag 854 is provided in addition to a normal destination address 852 and source address 853. A terminal having received a data packet in which the route switching flag 854 is set to "ON" switches a possible alternative route to a qualified route. Specifically, a route entry in which the destination address 611 corresponds to the destination address 852 is searched in the route table 610, and the link state 614 in such route entry is changed from the candidate state 45 to the valid state 41. Further, prior to the above, the link state 614 is changed to the invalid state 42 if there is one whose link state 614 is either the valid state 41 or stretched state 44 in the route entry in which the destination address 611 corresponds to the destination address 852.

Next, an operation in each process in the embodiment of the present invention is explained by referring to the accompanied drawing.

Figure 12:
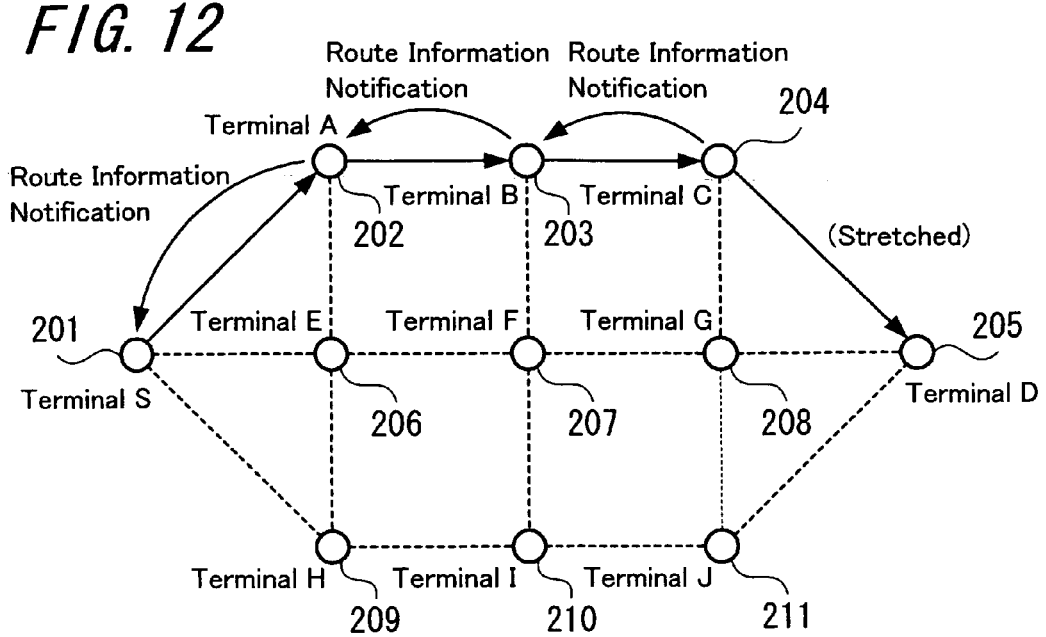
FIG. 12 is a diagram showing a route when a terminal C transmits a route information notification in the embodiment of the present invention.

FIG. 12 is a diagram showing a route when the terminal C transmits the route information notification packet 830 in the embodiment of the present invention. Here, it is assumed that a route passing through the terminal A, terminal B, and terminal C is used when transmission of data is performed from the terminal S to the terminal D. When the quality of the link between the terminal C and the terminal D deteriorates to become a stretched state, the terminal C transmits the route information notification packet 830 to the terminal B. In this case, the source address 833 shows the address of the terminal S that is a data transmission source, the upstream address 834 shows the address of the terminal C that transmits this route information notification packet 830, and the downstream address 835 shows the address of the terminal D that is the next hop, respectively, in the route information notification packet 830 shown in FIG. 7. As the link state 832, it is shown that the link state is the stretched state.

The terminal B having received this route information notification packet 830 retains data to be transmitted thereafter to the terminal C in the data buffer 620 thereof. The terminal B transfers this route information notification packet 830 further to the upstream terminal A. Hence, the terminal A also starts retaining data to be transmitted thereafter to the terminal B in the data buffer 620 thereof. Similarly, the terminal A transfers this route information notification packet 830 further to the upstream terminal S. Hence, the terminal S also starts retaining data to be transmitted thereafter to the terminal A in the data buffer 620 thereof. Since the terminal S is a transmission source of the data and the source address 833 corresponds to the address thereof, the terminal S does not transfer this packet any further.

Figure 13:
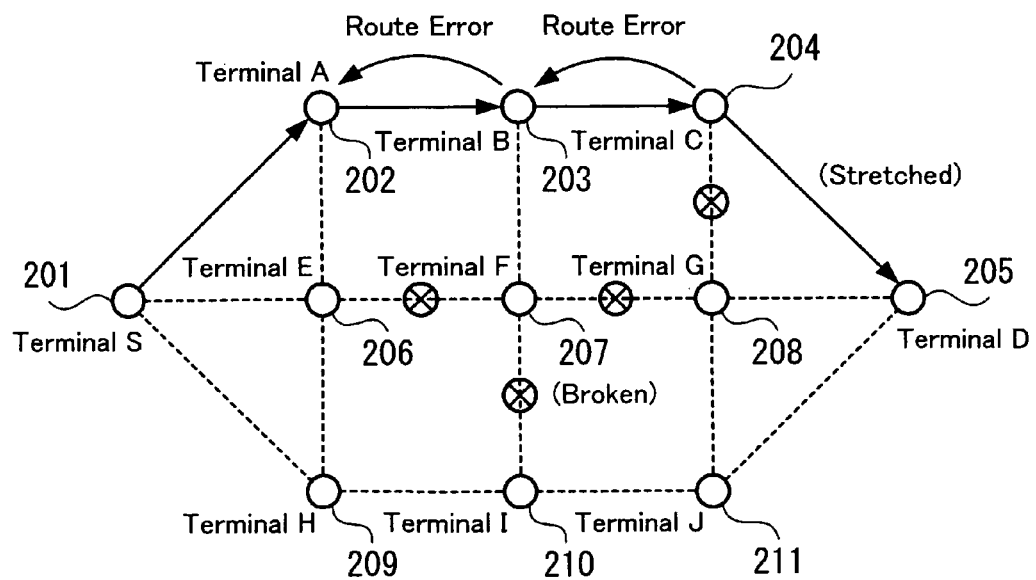
FIG. 13 is a diagram showing a route when the terminal C transmits a route error in the embodiment of the present invention.

FIG. 13 is a diagram showing a route when the terminal C transmits the route error packet 840 in the embodiment of the present invention. After the terminal C transmits the route information notification packet 830 in FIG. 12, the terminal C transmits the route request packet 810 in order to search an alternative route in place of the route between the terminal C and the terminal D which is the stretched state. Viewing from the terminal C, neighbor terminals other than the terminal D are the terminal B and terminal G. Since the terminal B is included in the preceding list 617 of the present route, a route passing through the terminal B is not searched at this stage. Here, if a route between the terminal C and the terminal G is already broken as shown in FIG. 13, a route passing through the terminal G can not be discovered, either. Therefore, the terminal C can not discover any other route. Then, the terminal C transmits the route error packet 840 to the terminal B.

The terminal B having received this route error packet 840 transmits the route request packet 810 in order to search an alternative route between the terminal B and the terminal D. Viewing from the terminal B, neighbor terminals other than the terminal C are the terminal A and terminal F. Since the terminal A is included in the preceding list 617 of the present route, a route passing through the terminal A is not searched at this stage. Here, if a route between the terminal F and the terminal G and a route between the terminal F and the terminal I are already broken as shown in FIG. 13, the terminal B can not discover any other route. Then, the terminal B transfers the route error packet 840 to the terminal A.

The terminal A having received this route error packet 840 transmits the route request packet 810 in order to search an alternative route between the terminal A and the terminal D. Viewing from the terminal A, neighbor terminals other than the terminal B are the terminal S and terminal E. Since the terminal S is included in the preceding list 617 of the present route, a route passing through the terminal S is not searched at this stage. With respect to the terminal E, a route to the terminal F is broken but a route to the terminal H is connected as shown in FIG. 13. The route request packet 810 transmitted from the terminal A is transferred until the packet reaches the terminal D from the terminal E, through the terminal H, terminal I, and terminal J. During this process, a route toward the terminal S from the terminal D is set in the route tables 610 in the terminals on the route. At this stage, the link state 614 on this route is a candidate state.

The terminal D having received the route request packet 810 transmits the route reply packet 820 to the terminal J. This route reply packet 820 is transferred in a reverse direction to the route in which this route request packet 810 has been transferred. During this process, a route toward the terminal D from the terminal S is set in the route tables 610 in the terminals on the route. At this stage, the link state 614 on this route is the candidate state.

Figure 14:
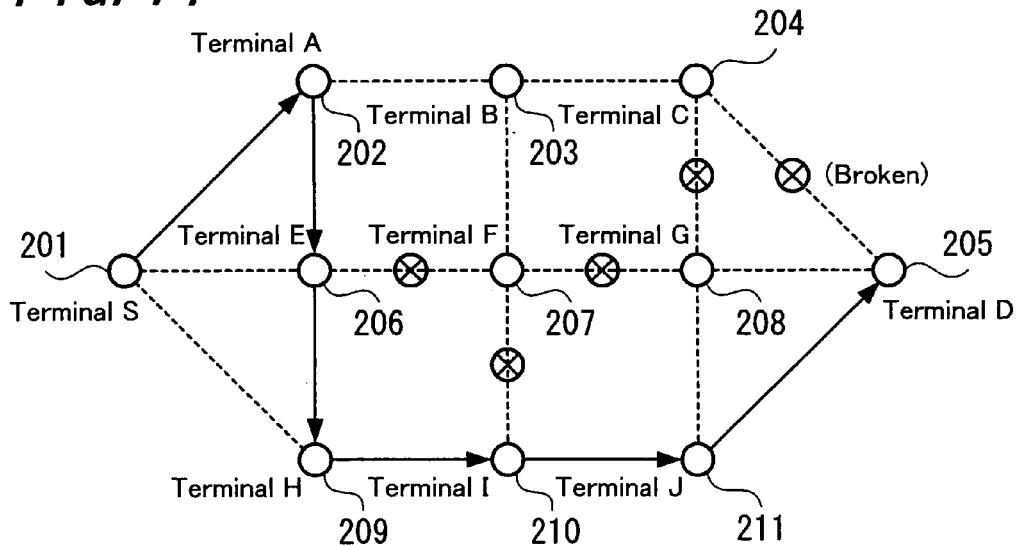
FIG. 14 is a diagram showing a state in which a route is switched to an alternative route between a terminal S and a terminal D in the embodiment of the present invention.

FIG. 14 is a diagram showing a state in which the route is switched to the alternative route between the terminal S and the terminal D in the embodiment of the present invention. As described above, the link state 614 on the route is the candidate state at the stage where the alternative route has been set by the route request packet 810 and route reply packet 820. The terminal A transmits the route switching packet 850 to the terminal E in order to make this route switched into a qualified route. The terminal E on the alternative route having received this route switching packet 850 changes the link of the candidate state into a valid state after changing the former route into an invalid state. Further, this route switching packet 850 is transferred until the packet reaches the terminal D from the terminal E, through the terminal H, terminal I, and terminal J. Hence, the alternative route is switched to be the qualified route.

Figure 15A:
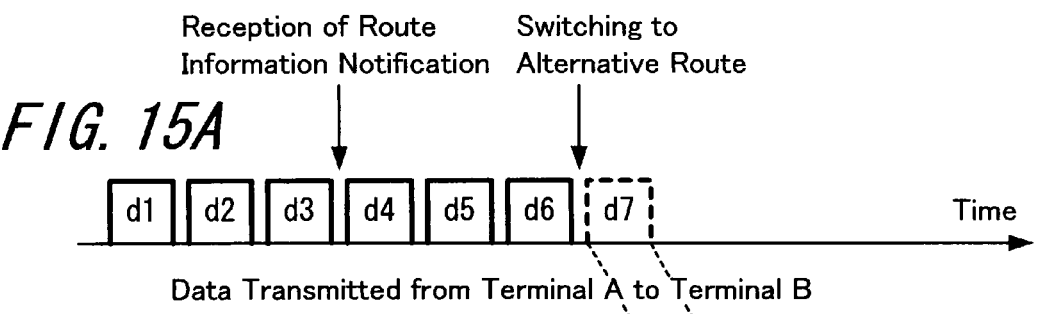
FIG. 15 is a diagram showing data transmission timing of a terminal A before and after the route information notification in the embodiment of the present invention.
Figure 15B:
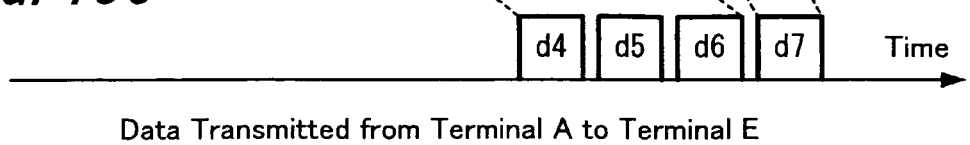
Figure 15C:
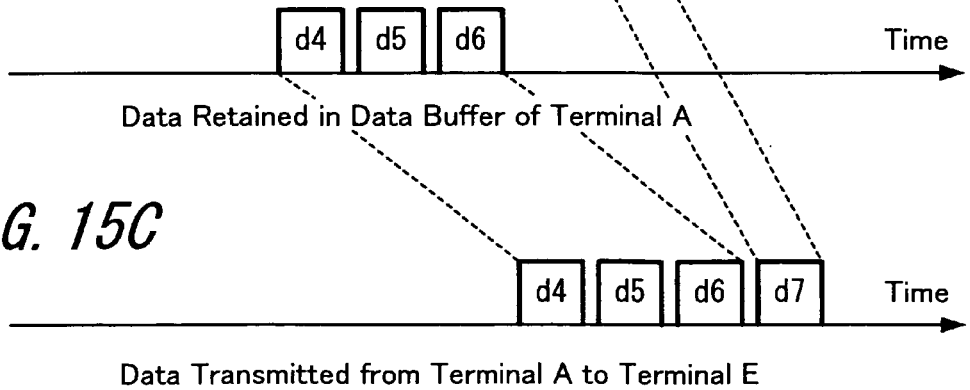

FIG. 15 is a diagram showing data transmission timing of the terminal A before and after a route information notification in the embodiment of the present invention. FIG. 15A shows a flow of data when the data is transmitted from the terminal A to the terminal B. Assuming that the route information notification packet 830 is received when the terminal A has transmitted data from d1 to d3, data on and after d4 is transmitted to the terminal B, and also is retained in the data buffer 620 of the terminal A as shown in FIG. 15B.

Assuming that the route switching packet 850 that the route is switched to the terminal E is received when the terminal A has transmitted data d6, the terminal A next transmits data to the terminal E. At this time, the terminal A first transmits data from d4 to d6 which have been retained in the data buffer 620 before transmitting the next data d7. Then, the terminal A successively transmits data on and after d7 to the terminal E after the transmission of the data from d4 to d6 which have been retained in the data buffer 620 is completed to the terminal E. In this way, the transmission data during the switching can be transmitted without omission at the time of the route switching. Here, although there is a possibility as a result that the data from d4 to d6 transmitted by the former route through the terminal B is received in duplicate by the terminal D, a problem does not occur since the terminal D discards the data reached later in that case.

Next, operations of the alternative route discovery process 50 and route switching process 60 in the embodiment of the present invention are explained by referring to the accompanied drawings.

Figure 16:
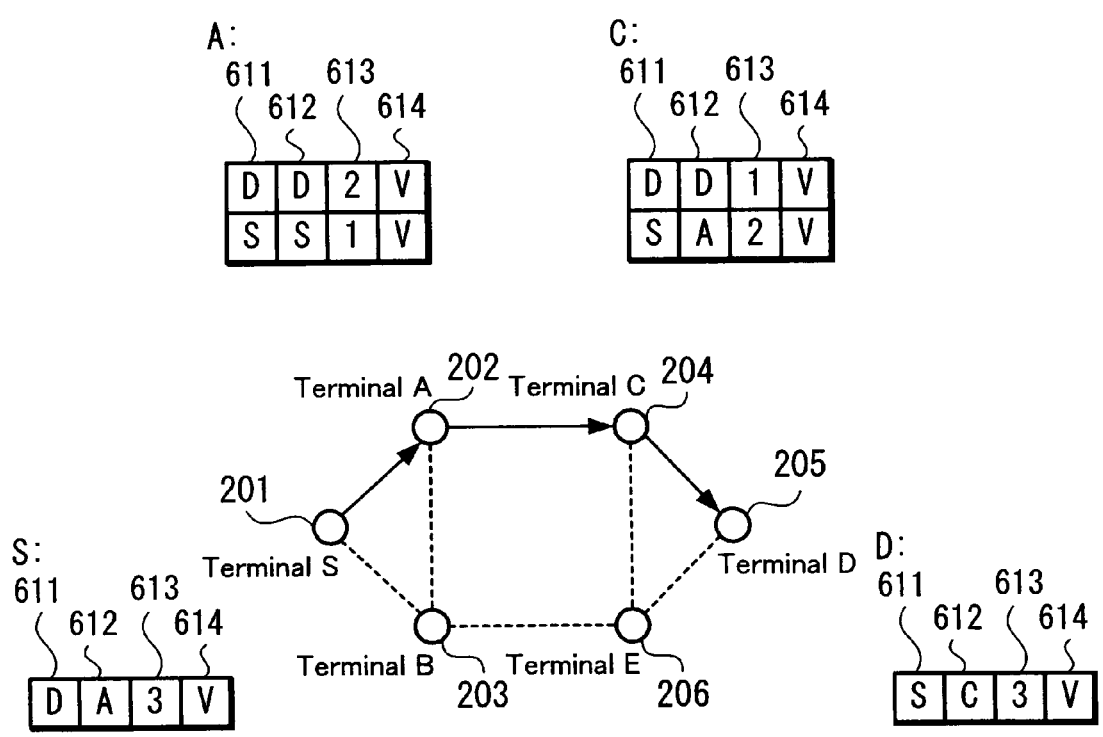
FIG. 16 is a diagram showing a route when communication is performed from the terminal S toward the terminal D and contents of a route table 610 in each terminal.

FIG. 16 is a diagram showing a route when communication is performed toward the terminal D from the terminal S and the contents of the route table 610 in each terminal. The terminal A and terminal C transfer a packet between the terminal S and the terminal D. At this time, in the route table 610 of the terminal S, the transfer destination address 612 is the terminal A in a route entry in which the terminal D is the destination address 611. Further, in the route table 610 of the terminal A, the transfer destination address 612 is the terminal C in a route entry in which the terminal D is the destination address 611, and the transfer destination address 612 is the terminal S in a route entry in which the terminal S is the destination address 611. Further, in the route table 610 of the terminal C, the transfer destination address 612 is the terminal D in a route entry in which the terminal D is the destination address 611, and the transfer destination address 612 is the terminal A in a route entry in which the terminal S is the destination address 611. In addition, in the route table 610 of the terminal D, the transfer destination address 612 is the terminal C in a route entry in which the terminal S is the destination address 611. Further, the link state for all of the above is the valid state 41.

Here, an assumption is made to a case where the quality of the link between the terminal A and terminal C deteriorates to become an stretched state. If the terminal A is an owner of this link, for example, the terminal A discovers an alternative route in the following procedure.

Figure 17:
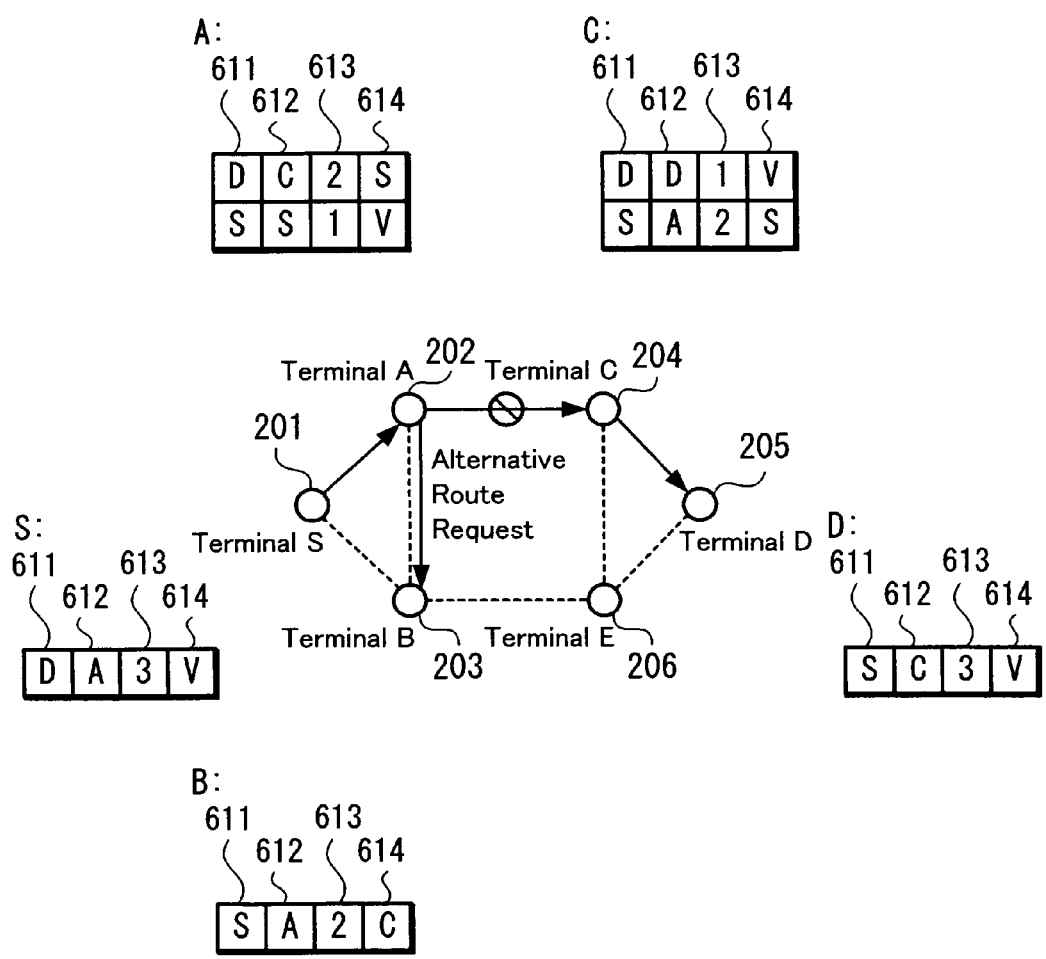
FIG. 17 is a diagram showing a route when the terminal A requests an alternative route and the contents of the route table 610 in each terminal.

FIG. 17 is a diagram showing a route and the contents of the route table 610 in each terminal when the terminal A requests an alternative route. Since the quality of the link between the terminal A and the terminal C has deteriorated, the link state 614 has changed from the valid state 41 to the stretched state 44 with respect to the route to the terminal D in the route table 610 of the terminal A and the route to the terminal S in the route table 610 of the terminal C.

The terminal A transmits by multiple uni-casts the route request packet 810 (FIG. 7) in which the alternative flag 812 is set. However, in case of this example, the transmission becomes the uni-cast transmission to the terminal B. The reason is that the link to the terminal C is the stretched state, also the terminal S is written in the preceding list 617 (FIG. 5), and therefore the terminal A does not transmit the route request packet 810 to the terminal S and terminal C. Further, the address of the terminal S which is a start of the route is written in the source address 817 of this route request packet 810.

The terminal B having received the route request packet 810 from the terminal A forms a route entry in which the destination address 611 is the terminal S and the transfer destination address 612 is the terminal A as a route toward the source address 817, and sets the link state 614 to the candidate state 45.

FIG. 18 is a diagram showing a route and the contents of the route table 610 in each terminal when the terminal B transfers the request of the alternative route. The terminal B having received the route request packet 810 from the terminal A forms the route entry as described above, and then transfers the route request packet 810 to the terminal S and terminal E. Similarly to the above, the terminal S having received the route request packet 810 interprets that this route request packet is the packet transmitted therefrom and discards this route request packet 810.

The terminal E having received the route request packet 810 from the terminal B forms a route entry in which the destination address 611 is the terminal S and the transfer destination address 612 is the terminal B as the route toward the source address 817, and sets the link state 614 to the candidate state 45.

Figure 19:
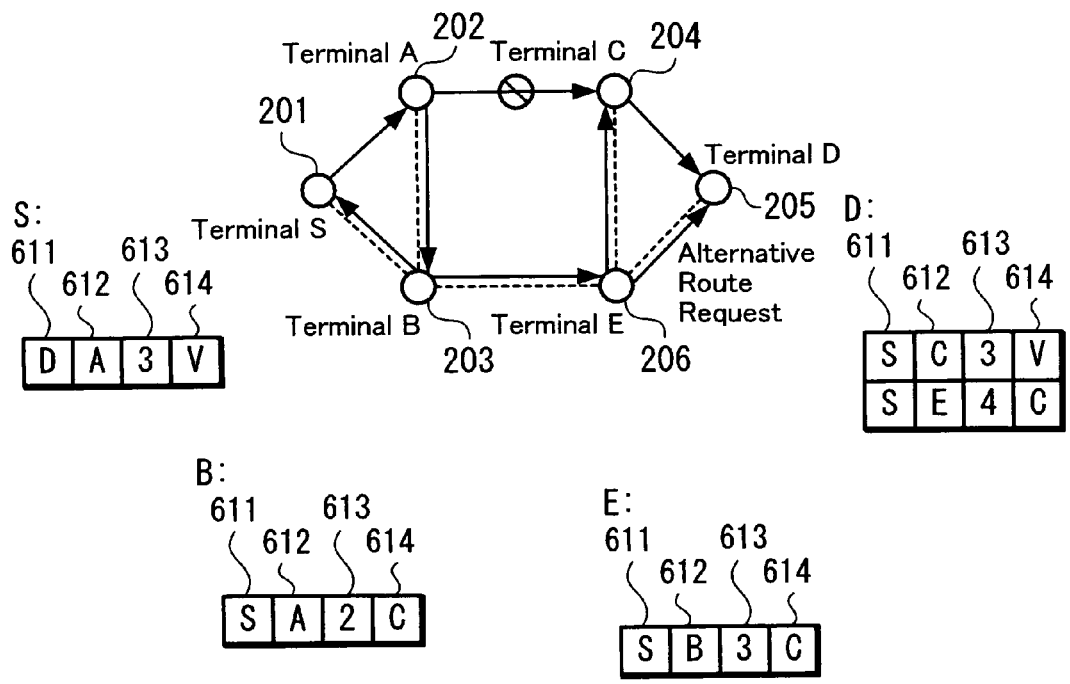
FIG. 19 is a diagram showing a route when a terminal E transfers the request of the alternative route and the contents of the route table 610 in each terminal.

FIG. 19 is a diagram showing a route and the contents of the route table 610 in each terminal when the terminal E transfers the request of the alternative route. The terminal E having received the route request packet 810 from the terminal B forms the route entry as described above, and then transfers the route request packet 810 further to the terminal C and terminal D.

The terminal D having received the route request packet 810 from the terminal E forms a route entry in which the destination address 611 is the terminal S and the transfer destination address 612 is the terminal E as the route toward the source address 817, and sets the link state 614 to the candidate state 45. Note that the terminal D receives thereafter the route request packet 810 from the terminal C but discards the route request packet 810 transmitted from the terminal C since the request identifier 814 of the route request packet 810 corresponds to the one previously received from the terminal E.

Figure 20:
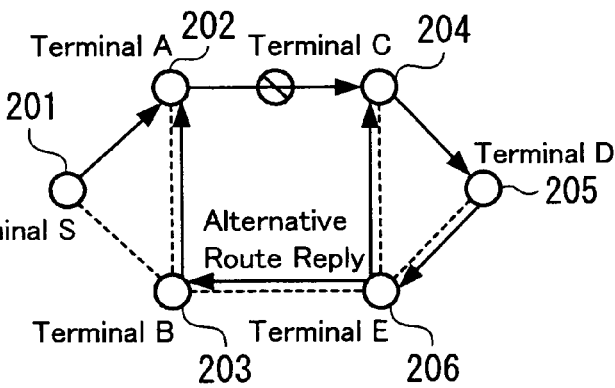
FIG. 20 is a diagram showing a route when the terminal D transmits a reply to the request of the alternative route and the contents of the route table 610 in each terminal.

FIG. 20 is a diagram showing a route and the contents of the route table 610 in each terminal when the terminal D transmits a reply to the request of the alternative route. The terminal D having received the route request packet 810 from the terminal E forms the route entry as described above, and then toward the terminal S transmits the route reply packet 820 (FIG. 9) in which the alternative flag 822 is set, as a reply to that route request packet 810. The destination address 825, source address 827, and agent address 828 of this route reply packet 820 correspond to the destination address 815, source address 817, and agent address 818 of the route request packet 810, respectively.

The route reply packet 820 from the terminal D is transferred in a similar procedure to the route request packet 810, and an alternative route is formed in each terminal. Specifically, the terminal E forms a route entry in which the destination address 611 is the terminal D and the transfer destination address 612 is the terminal D, and sets the link state 614 to the candidate state 45. The terminal B forms a route entry in which the destination address 611 is the terminal D and the transfer destination address 612 is the terminal E, and sets the link state 614 to the candidate state 45. In addition, the terminal A forms a route entry in which the destination address 611 is the terminal D and the transfer destination address 612 is the terminal B, and sets the link state 614 to the candidate state 45.

Since the alternative flag 822 is set and the agent address 828 is the address thereof, the terminal A receives the route reply packet 820 and does not transfer any further. Thus, the possible alternative route is set between the terminal S and the terminal D. Note that a route error packet is transmitted to the terminal A when there exists no route to be the alternative.

Figure 21:
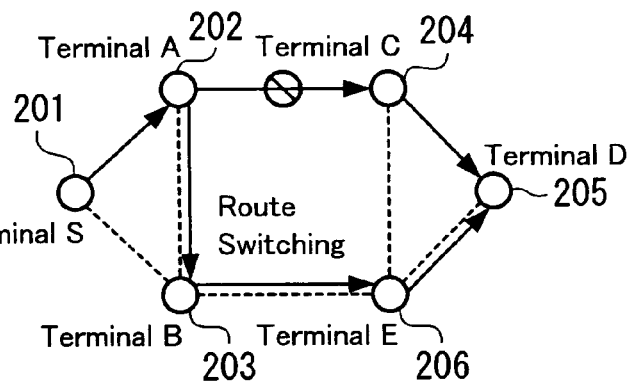
FIG. 21 is a diagram showing a route when the terminal A transmits a command to switch a possible alternative route to a qualified route and the contents of the route table 610 in each terminal.

FIG. 21 is a diagram showing a route and the contents of the route table 610 in each terminal when the terminal A transmits a command to switch a possible alternative route to a qualified route. When switching to the alternative route is selected, and when there is a route entry in which the destination address 611 is the terminal D and whose link state 614 is a stretched state or valid state in the route table 610 thereof, the terminal A first sets the link state 614 to an invalid state by using a data communication request generated thereafter as a trigger. Further, the link state 614 is set to a valid state for a route entry in which the destination address 611 is the terminal D and whose link state 614 is a candidate state. Specifically, the link state 614 of the route in which the transfer destination address 612 is the terminal C is changed from the stretched state to the invalid state, the link state 614 of the route in which the transfer destination address 612 is the terminal B is changed from the candidate state to the valid state. Further, the terminal A transmits the route switching packet 850 directed to the terminal D to the terminal B by referring to the route table 610 in which the link state 614 is thus changed.

The terminal B having received the route switching packet 850 from the terminal A changes the link state 614 of the route in which the transfer destination address 612 is the terminal E from the candidate state to the valid state. The terminal B transfers the route switching packet 850 to the terminal E by referring to the route table 610 in which the link state 614 is thus changed.

The terminal E having received the route switching packet 850 from the terminal B changes the link state 614 of the route in which the transfer destination address 612 is the terminal D from the candidate state to the valid state. The terminal E transfers the route switching packet 850 further to the terminal D by referring to the route table 610 in which the link state 614 is thus changed. In this manner, a route table in the forward direction is set when the route switching packet 850 transmitted by the terminal A reaches the terminal D.

Figure 22:
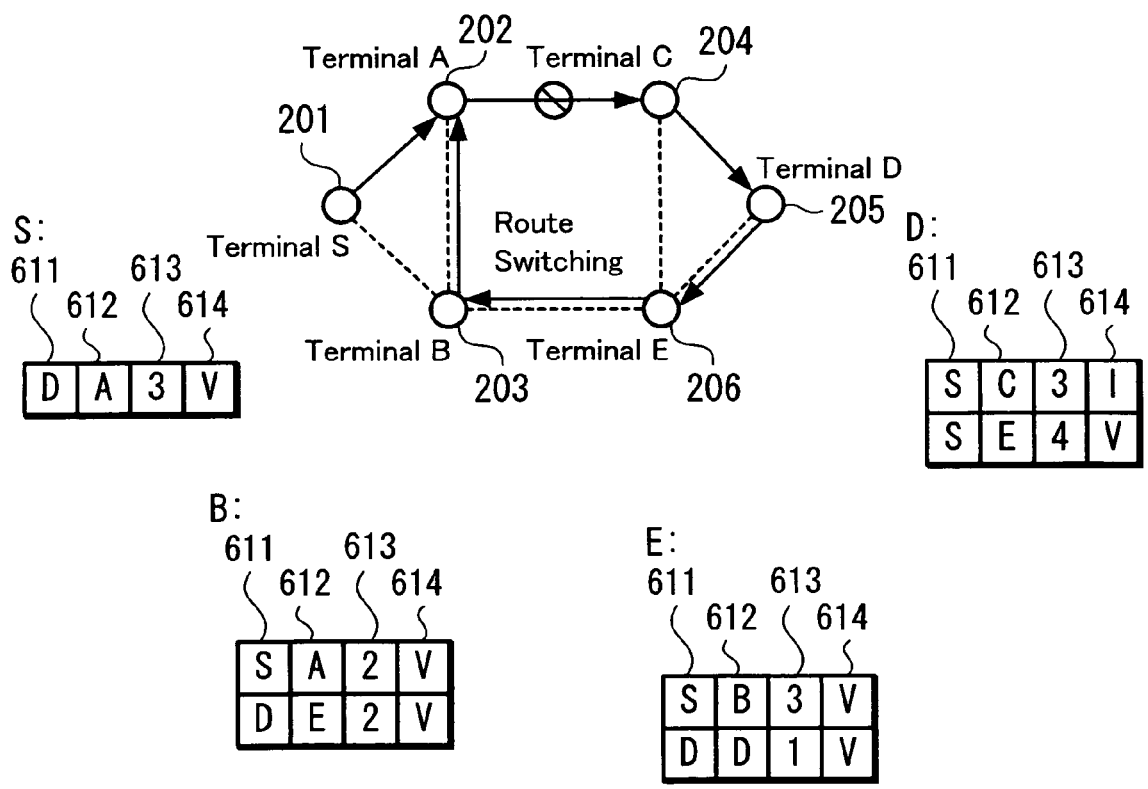
FIG. 22 is a diagram showing a route when the terminal D transmits a command to switch a possible alternative route to a qualified route and the contents of the route table 610 in each terminal.

FIG. 22 is a diagram showing a route and the contents of the route table 610 in each terminal when the terminal D transmits a command to switch a possible alternative route to the qualified route. The terminal D having received the route switching packet 850 from the terminal E changes the link state 614 of the route in which the transfer destination address 612 is the terminal C from the valid state to the invalid state and changes the link state 614 of the route in which the transfer destination address 612 is the terminal E from the candidate state to the valid state by using a data communication request generated thereafter as a trigger. Further, the terminal D transmits this time the route switching packet 850 directed to the terminal S to the terminal E by referring to the route table 610 in which the link state 614 is thus changed.

The terminal E having received the route switching packet 850 from the terminal D changes the link state 614 of the route in which the transfer destination address 612 is the terminal B from the candidate state to the valid state. The terminal E transfers the route switching packet 850 to the terminal B by referring to the route table 610 in which the link state 614 is thus changed.

The terminal B having received the route switching packet 850 from the terminal E changes the link state 614 of the route in which the transfer destination address 612 is the terminal A from the candidate state to the valid state. The terminal B transfers the route switching packet 850 further to the terminal A by referring to the route table 610 in which the link state 614 is thus changed. In this manner, a route table in the reverse direction is set when the route switching packet 850 transmitted by the terminal D reaches the terminal A.

Figure 23:
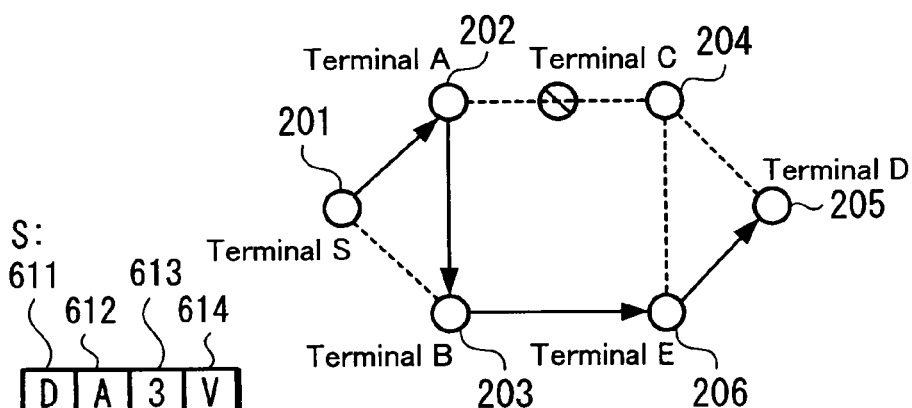
FIG. 23 is a diagram showing a state in which a route is switched to an alternative route between the terminal S and the terminal D and the contents of the route table 610 in each terminal.

FIG. 23 is a diagram showing a state where the route is switched to the alternative route between the terminal S and the terminal D and the contents of the route table 610 in each terminal. When predetermined time passes in this state, or when the link quality between the terminal A and the terminal C further deteriorates to become a state completely incapable of performing the communication, an unnecessary route entry in the route table 610 is deleted by the link state management process 40. For example, there is such a possibility that the route entry in which the transfer destination address 612 is the terminal C is deleted in the route table 610 of the terminal A, the route entry in which the transfer destination address 612 is the terminal D is deleted in the route table 610 of the terminal C, and the route entry in which the transfer destination address 612 is the terminal C is deleted in the route table 610 of the terminal D. On the other hand, in case that the link quality between the terminal A and the terminal C improves and the link quality between the terminal B and the terminal E deteriorates, there is also a possibility that the route is switched again to the former route.

Next, a processing method in each terminal according to the embodiment of the present invention is explained by referring to the accompanied drawings.

Figure 24:
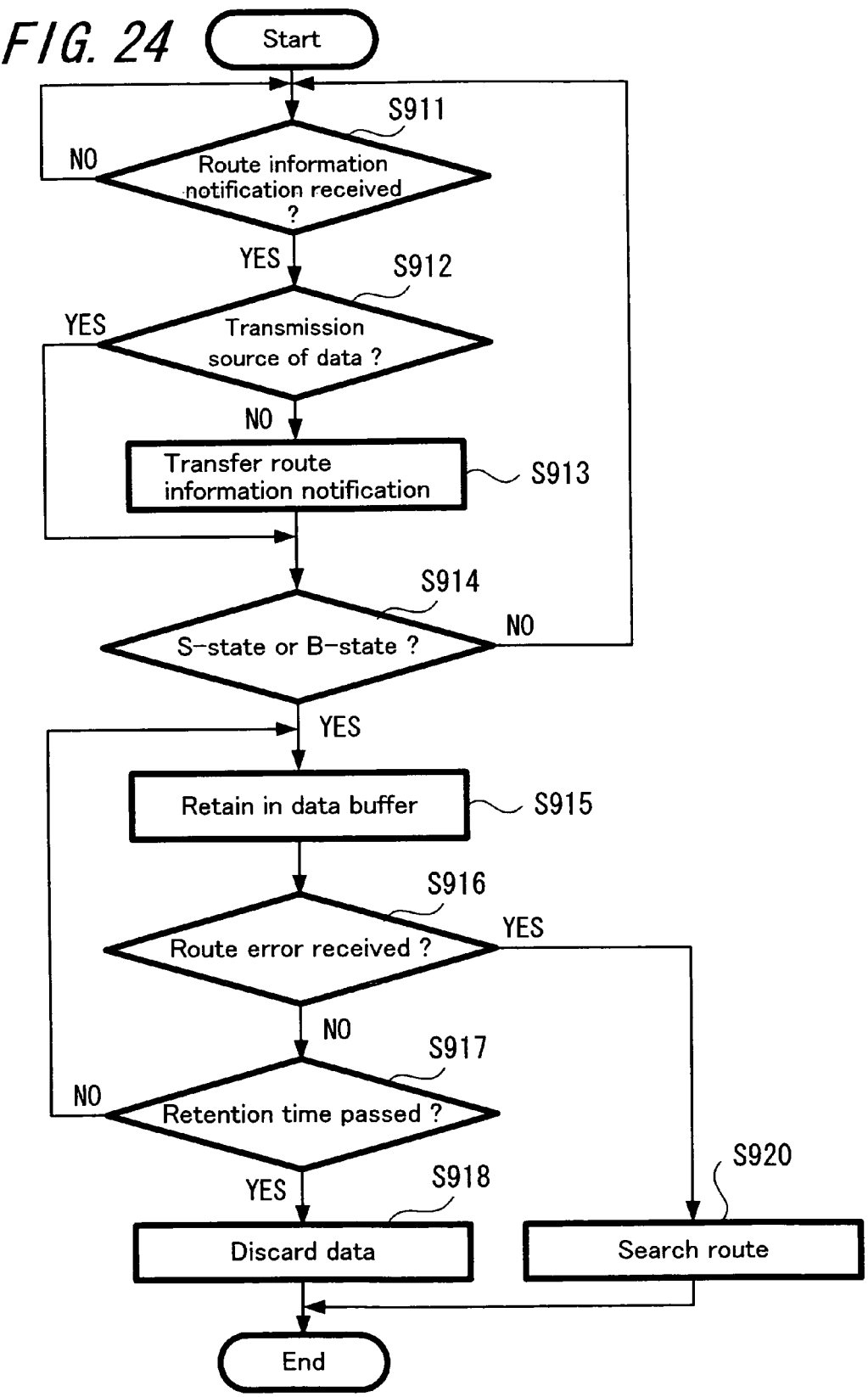
FIG. 24 is a flow chart showing a processing procedure when the wireless terminal 100 in the embodiment of the present invention receives the route information notification packet 830.

FIG. 24 is a flow chart showing a processing procedure in the case where the wireless terminal 100 in the embodiment of the present invention receives the route information notification packet 830. When the wireless terminal 100 receives the route information notification packet 830 (step S911), and when the source address 833 of the route information notification packet 830 is not the address thereof (step S912), the wireless terminal 100 transfers the route information notification packet 830 toward the source address 833 (step S913). Further, when the link state 832 of this route information notification packet 830 is other than a stretched state or break state (that is, a valid state, invalid state, or candidate state) (step S914), the next route information notification packet 830 is received (step S911).

In step S914, when it is judged that the link state 832 is the stretched state or break state, the wireless terminal 100 retains transmission data on the present route in the data buffer 620 (step S915). Further, when the route error packet 840 is received before the data retention time 836 passes (step S917), an alternative route therefrom to a destination terminal is searched (step S920). This is described later by referring to FIG. 25.

On the other hand, when the data retention time 836 passes (step S917) after starting the retention of data in the data buffer 620 (step S915), the data retained in the data buffer 620 is discarded (step S918).

Figure 25:
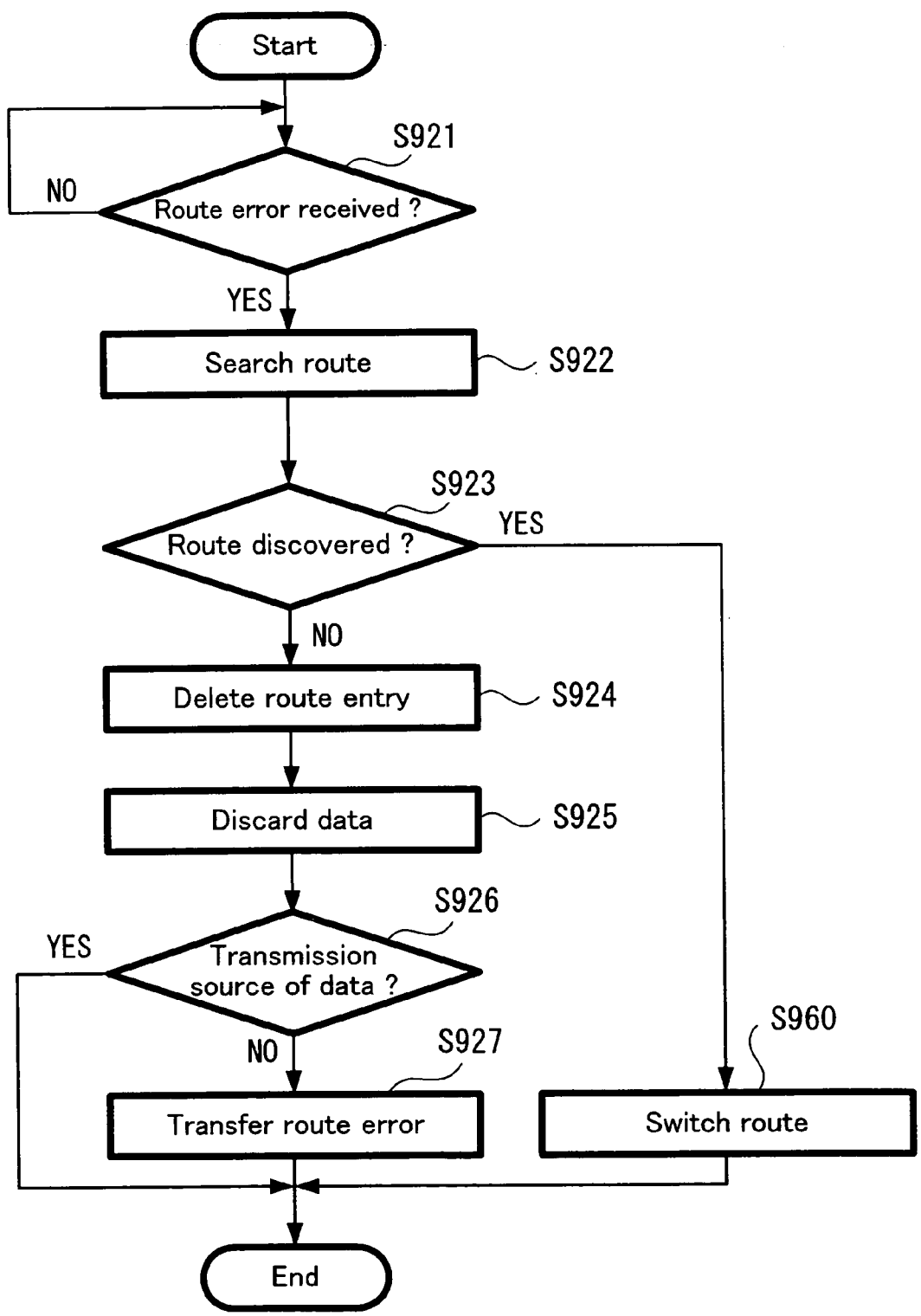
FIG. 25 is a flow chart showing a processing procedure when the wireless terminal 100 in the embodiment of the present invention receives the route error packet 840.

FIG. 25 is a flow chart showing a processing procedure when the wireless terminal 100 in the embodiment of the present invention receives the route error packet 840. When the route error packet 840 is received (step S921), the wireless terminal 100 transmits the route request packet 810 in order to search an alternative route from the terminal to the destination terminal (step S922). When the route reply packet 820 is received with respect to this route request packet 810, the alternative route to the destination terminal is discovered (step S923), and so a switching to the alternative route is performed by transmitting the route switching packet 850 (step S960). Those procedures from the route search to the route switching are described later by referring to FIGS. 26 through 28.

When the route can not be discovered in step S923, the route entry is deleted from the route table 610 or is changed to an invalid state (step S924), and the data retained in the data buffer 620 is discarded (step S925). Further, when the terminal itself is not the transmission source of the data (step S926), the route error packet 840 is transferred to the address written in the preceding list 617 (step S927).

Figure 26:
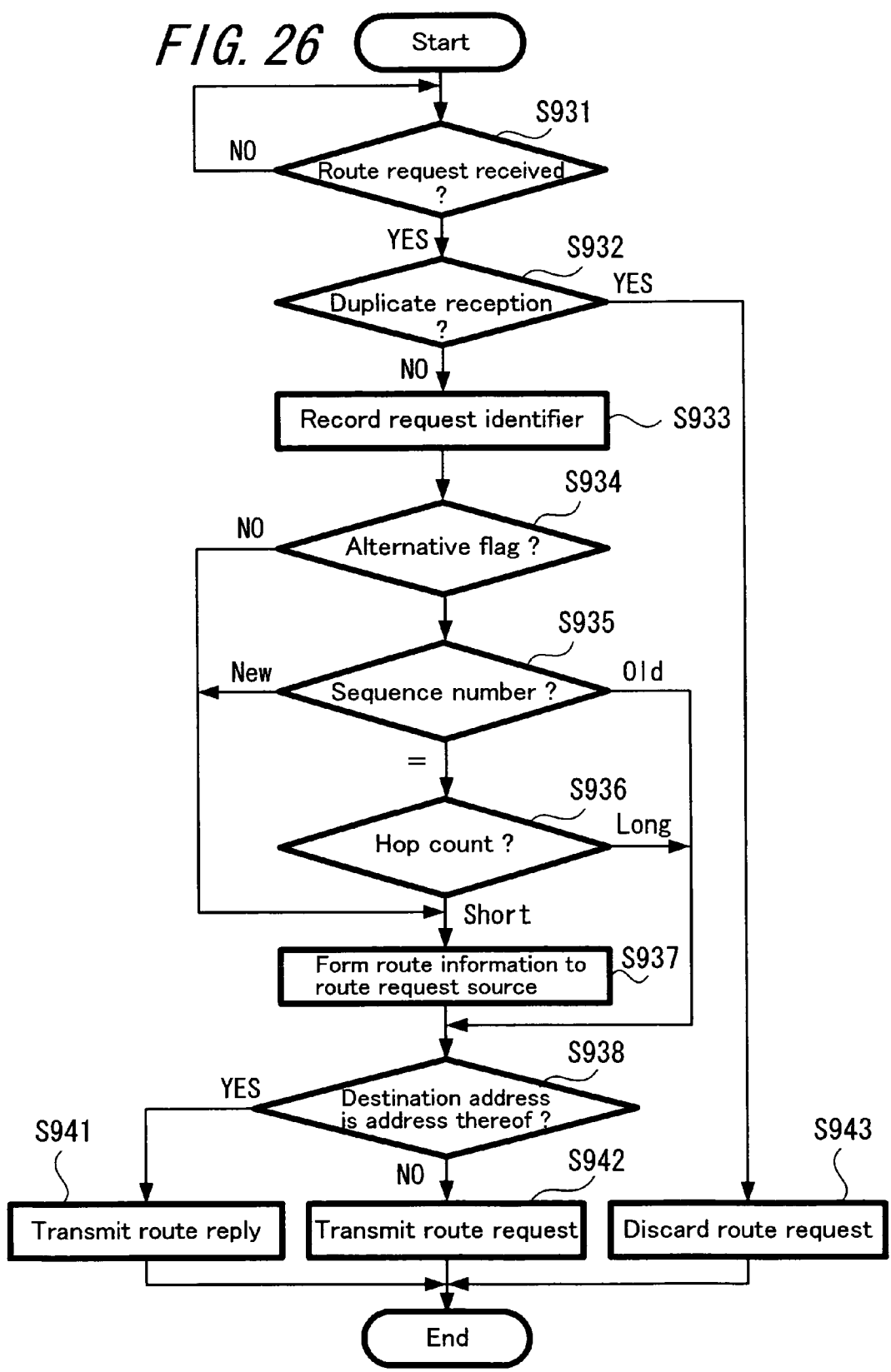
FIG. 26 is a flow chart showing a processing procedure when the wireless terminal 100 in the embodiment of the present invention receives the route request packet 810.

FIG. 26 is a flow chart showing a processing procedure when the wireless terminal 100 in the embodiment of the present invention receives the route request packet 810. When the wireless terminal 100 receives the route request packet 810 (step S931), it is judged whether this route request packet is received in duplicate by referring to the request identifier 814 of the route request packet 810 (step S932). If a route request packet having the same request identifier has already been received, the route request packet 810 received later is discarded (step S943).

When it is judged in step S932 that this reception is not duplication, the request identifier 814 of that route request packet 810 is recorded (step S933), and is used thereafter for judgment of the duplicated reception. Then, the alternative flag 812 of that route request packet 810 is referred to, and it is judged whether this alternative flag 812 is set to "ON", specifically whether this route request packet 810 is a route request for discovering an alternative route (step S934). When this route request packet 810 is the alternative route discovery request, route information toward the route request source is formed without making judgments of the following steps of S935 and S936 (step S937).

When it is judged in step S934 that this route request packet is not the alternative route discovery request but a normal (initial) route request, checking on the sequence number (step S935) and checking on the hop count (step S936) are performed. Specifically, when the destination sequence number 816 of the route request packet 810 is newer than the sequence number 615 of the route set at present, the route information toward the route request source is formed (step S937). On the other hand, when the destination sequence number 816 of the route request packet 810 is older than the sequence number 615 of the route set at present, the route information is not formed (step S937). In addition, when the destination sequence number 816 of the route request packet 810 corresponds to the sequence number 615 of the route set at present, the hop count 813 of the route request packet 810 is compared with the number of destination hops 613 of the route which is set at present, and the route information toward the route request source is formed (step S937) when the hop count 813 of the route request packet 810 is shorter.

When the route information toward the route request source is formed in step S937, the following processing is specifically performed. That is, the destination sequence number 816 of the route request packet 810 is set to the sequence number 615, a number in which "1" is added to the hop count 813 of the route request packet 810 is set to the number of destination hops 613, and an address of a neighbor terminal which has transmitted the route request packet 810 is set to the transfer destination address 612. In addition, the link state 614 is set to a valid state when this route request packet is the normal (initial) route request, but the link state 614 is set to a candidate state when this route request packet is the alternative route discovery request.

Further, when the destination address 815 of the route request packet 810 is the address thereof (step S938), the route reply packet 820 is transmitted to this route request packet 810 (step S941). On the other hand, when the destination address 815 of the route request packet 810 is not the address thereof, the route request packet 810 is transferred to another terminal (step S942). At this time, this route request packet is transmitted by a broadcast when this route request packet is the normal (initial) route request, but this route request packet is transmitted by multiple uni-casts to terminals which are other than the terminal connected to a link of the stretched state and which are not written in the preceding list 617 (FIG. 5), when this route request packet is the alternative route discovery request.

Figure 27:
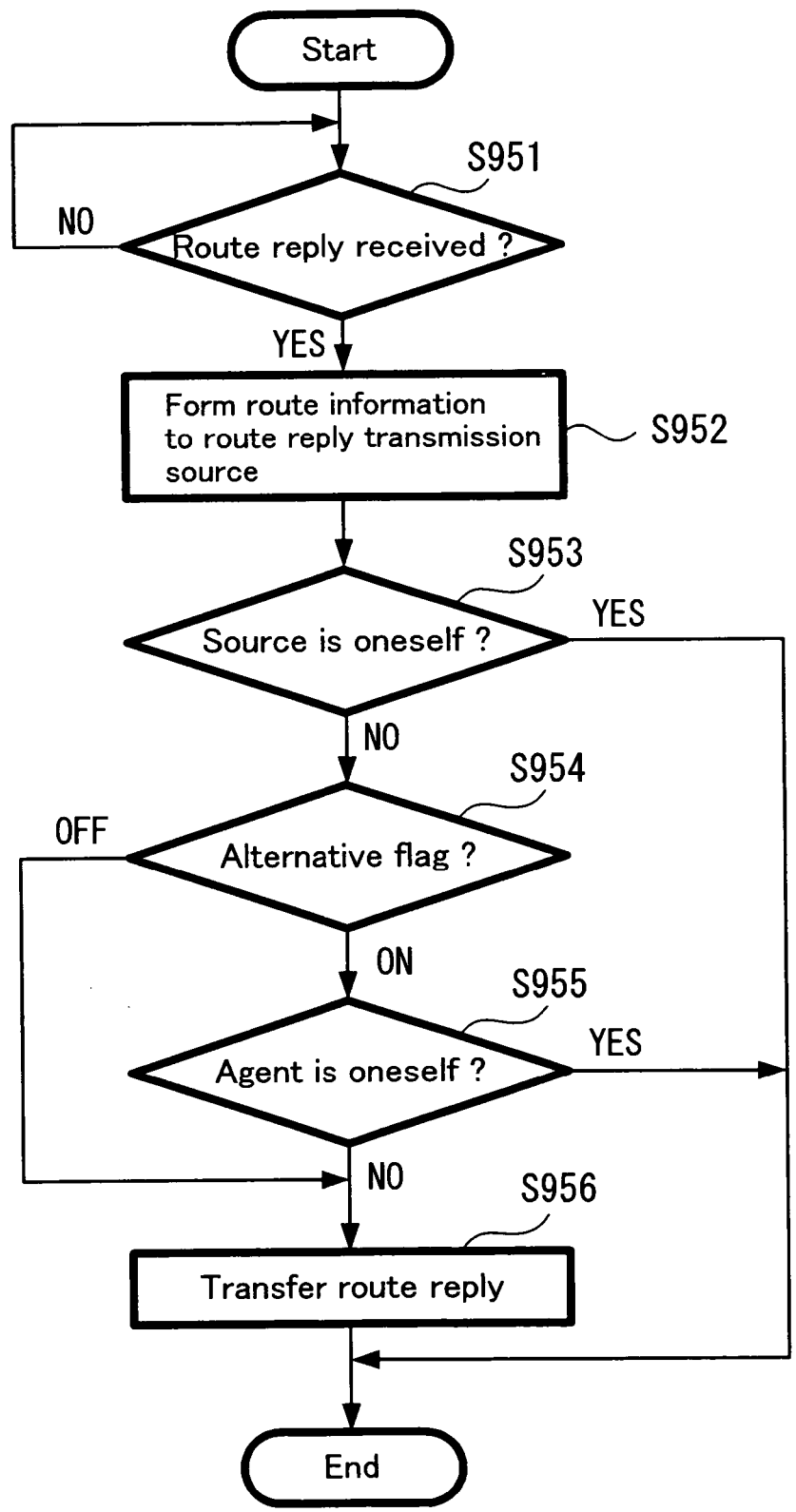
FIG. 27 is a flow chart showing a processing procedure when the wireless terminal 100 in the embodiment of the present invention receives the route reply packet 820.

FIG. 27 is a flow chart showing a processing procedure when the wireless terminal 100 in the embodiment of the present invention receives the route reply packet 820. When the wireless terminal 100 receives the route reply packet 820 (step S951), route information toward a transmission source of the route reply is formed (step S952).

Further, when the source address 827 of the route reply packet 820 corresponds to the address thereof (step S953), the process is ended without performing further processing since it means that a qualified route is set. On the other hand, when the source address 827 of the route reply packet 820 does not correspond to the address thereof, the alternative flag 822 is further checked (step S954), and when the alternative flag 822 is not set, that route reply packet 820 is further transferred by interpreting that as a normal route reply (step S956).

When the alternative flag 822 is set in step S954, the agent address 828 is further checked (step S955), and when the agent address 828 does not correspond to the address thereof, the route reply packet 820 is further transferred (step S956) On the other hand, when the agent address 828 corresponds to the address thereof, the process is ended without performing further processing since it means that a reply to the alternative route request transmitted from the terminal itself is returned.

Figure 28:
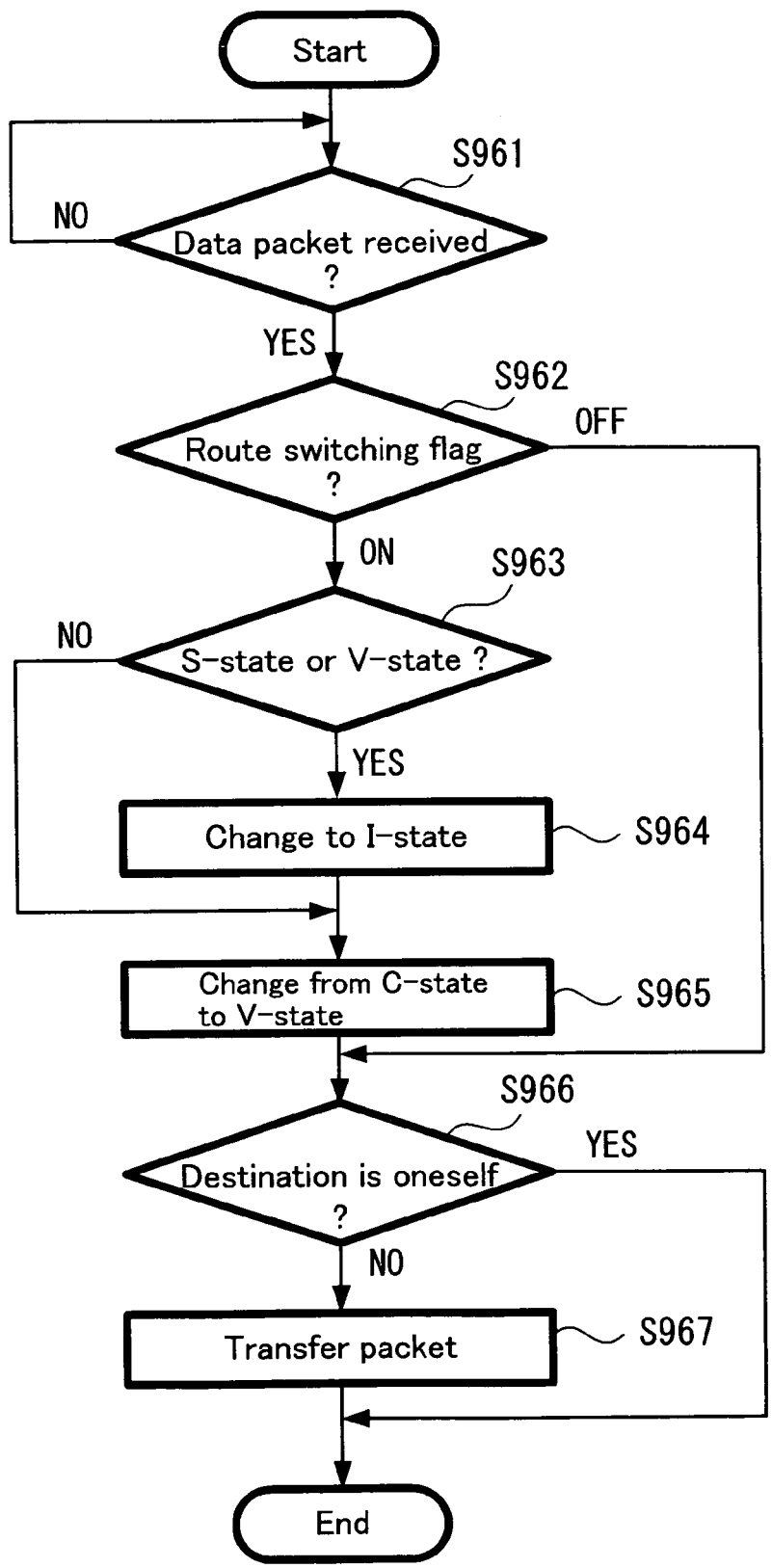
FIG. 28 is a flow chart showing a processing procedure when the wireless terminal 100 in the embodiment of the present invention receives the route switching packet 850.

FIG. 28 is a flow chart showing a processing procedure when the wireless terminal 100 in the embodiment of the present invention receives the route switching packet 850. When the wireless terminal 100 receives a data packet (step S961), it is checked whether or not the route switching flag 854 of the data packet is set (step S962). When the route switching flag 854 is not set, a switching of the route is not performed since the data packet is normal one.

When it is judged in step S962 that the route switching flag 854 is set, the switching of the route is performed in the following procedure since the data packet is the route switching packet 850. First, in the route table 610, when there is a route whose link state 614 is a valid state or stretched state in a route entry in which the destination address 611 corresponds to the destination address 852 (step S963), the link state 614 is changed to an invalid state (step S964). Then, in the route table 610, the link state 614 is changed from a candidate state to a valid state in the route entry in which the destination address 611 corresponds to the destination address 852 (step S965).

Further, when the destination address 852 corresponds to the address thereof (step S966), the process is ended without performing further processing. On the other hand, when the destination address 852 does not correspond to the address thereof, the data packet is transferred to another terminal in accordance with the route table 610 (step S967).

Thus, according to the embodiment of the present invention, a state of the link 30 on the route set by the route discovery process 20 is monitored by the link state management process 40, and an alternative route is searched by the alternative route search process 60 after the link state is notified by the route information notification process 50 when the link quality deteriorates. Accordingly, a terminal having received the notification starts the retention of transmission data and prepares for the switching of the alternative route thereafter in the route switching process 70.

Also, when an alternative route is not discovered from a certain terminal in the alternative route search process 60, a route error is transmitted to a neighbor terminal on the transmission side, and a terminal having received the route error searches an alternative route. Accordingly, it is possible to set the alternative route without deleting all the routes. Specifically, it is possible to perform stable communication even in an ad hoc network environment having a deteriorated radio wave condition such that a failure of a link frequently occurs, and a network of high reliability can be provided in which the communication is performed continuously even in an environment of the ad hoc network in which a movement of a node happens frequently.

Having described preferred embodiments of the invention with reference to the accompanying drawings, it is to be understood that the invention is not limited thereto and that various changes and modifications could be effected therein without departing from the spirit or scope of the invention.

Moreover, the processing procedures described above may be interpreted as a method having the series of procedures, and it is also possible to interpret as a program to make these series of procedures executed by a computer and/or a recording medium to store that program.

The invention claimed is:

1. A wireless ad hoc communication system including a plurality of terminals, comprising:
   a first intermediate terminal which transmits an alternative route discovery request when the quality of a link connected to the first intermediate terminal deteriorates between a source terminal that transmits communication data and a destination terminal that receives said communication data; and
   a second intermediate terminal which is positioned upstream with respect to said first intermediate terminal between the source terminal and said destination terminal and which transmits data to said first intermediate terminal,
   wherein,
      said first intermediate terminal transmits a route error notification to said second intermediate terminal when said request fails,
      said second intermediate terminal transmits an another alternative route discovery request when said notification is received from said first intermediate terminal,
      a link state of an another alternative route, discovered as a result of said another alternative route discovery request, between said second intermediate terminal and said destination terminal is set as a candidate state, and
      said first intermediate terminal notifies said second intermediate terminal of route information on the link when the quality of the link connected to the first terminal deteriorates, and said second intermediate terminal includes a data buffer and retains in said data buffer said data transmitted to said first intermediate terminal when said notification is received from said first intermediate terminal.

2. A wireless ad hoc communication system including a plurality of terminals, comprising:
- a source terminal which transmits communication data;
- a destination terminal which receives said communication data;
- a first intermediate terminal which transmits an alternative route discovery request when the quality of a link connected to the first intermediate terminal deteriorates at the time of transferring said communication data between said source terminal and said destination terminal; and
- a second intermediate terminal which sets a link state of a possible alternative route as a candidate state to said source terminal when said request is received and which transfers the request to further another terminal, said second intermediate terminal being positioned upstream with respect to said first intermediate terminal between the source terminal and said destination terminal, wherein,
- said destination terminal transmits a reply to the request when said request is received,
- said second intermediate terminal sets the possible alternative route to said destination terminal when said reply is received and transfers the reply to further another terminal,
- said first intermediate terminal transmits a first command to switch the route after receiving said reply,
- said second intermediate terminal switches the possible alternative route to said destination terminal as a qualified route when said first command is received and transfers the first command to further another terminal,
- said destination terminal transmits a second command to switch when said first command is received, and
- said second intermediate terminal switches the possible alternative route to said source terminal as the qualified route when said second command is received and transfers the second command to further another terminal, said qualified alternative route links said second intermediate terminal to said destination terminal.

* * * * *